United States Patent
Kobayashi et al.

(10) Patent No.: US 7,806,768 B2
(45) Date of Patent: Oct. 5, 2010

(54) GAME SYSTEM AND METHOD FOR CONTROLLING GAME SYSTEM, GAME SERVER DEVICE THEREFOR, AND GAME DEVICE THEREFOR

(75) Inventors: Kenji Kobayashi, Minato-ku (JP); Masaru Nakamura, Minato-ku (JP); Ryuta Tamura, Minato-ku (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 299 days.

(21) Appl. No.: 11/667,775

(22) PCT Filed: Oct. 24, 2005

(86) PCT No.: PCT/JP2005/019487

§ 371 (c)(1),
(2), (4) Date: May 15, 2007

(87) PCT Pub. No.: WO2006/051681

PCT Pub. Date: May 18, 2006

(65) Prior Publication Data

US 2008/0132336 A1    Jun. 5, 2008

(30) Foreign Application Priority Data

Nov. 15, 2004 (JP) ............................. 2004-330797

(51) Int. Cl.
*A63F 13/00* (2006.01)
(52) U.S. Cl. .............................. 463/43; 463/29; 463/40
(58) Field of Classification Search .................. 463/29, 463/40, 42, 43
See application file for complete search history.

(56) References Cited

U.S. PATENT DOCUMENTS

| | | | |
|---|---|---|---|
| 6,253,167 B1 | 6/2001 | Matsuda et al. | |
| 6,268,872 B1 | 7/2001 | Matsuda et al. | |
| 6,676,521 B1 * | 1/2004 | La Mura et al. | 463/42 |
| 6,908,389 B1 * | 6/2005 | Puskala | 463/40 |

(Continued)

FOREIGN PATENT DOCUMENTS

EP    0988878 A    3/2000

(Continued)

OTHER PUBLICATIONS

Supplementary European Search Report dated Oct. 22, 2008.

*Primary Examiner*—James S McClellan
(74) *Attorney, Agent, or Firm*—Sughrue Mion, PLLC

(57) ABSTRACT

A game server device (3) stores message information representing contents of a message sent by a player and a card ID identifying each of a plurality of players in association with each other. Each of plural game devices (1) reads from a card (2) a card ID for transmission to the game server device (3), receives individual information corresponding to the card ID for storage, and transmits the individual information to an opponent participant's game device (1) so that the information is stored therein. Each game device (1), in a case in which an event is detected, displays a message represented by individual information that has been stored and requests an opponent participant's game device (1) to display the message. Furthermore, each game device (1), in a case in which the display of a message is requested from an opponent participant's game device (1), displays a message represented by individual information that has been stored.

16 Claims, 17 Drawing Sheets

U.S. PATENT DOCUMENTS

| | | |
|---|---|---|
| 7,056,217 B1 * | 6/2006 | Pelkey et al. ............... 463/43 |
| 7,491,123 B2 * | 2/2009 | Smith ..................... 463/35 |
| 2002/0165024 A1 * | 11/2002 | Puskala ................... 463/40 |
| 2002/0183114 A1 | 12/2002 | Takahashi et al. |
| 2002/0183115 A1 | 12/2002 | Takahashi et al. |
| 2002/0183117 A1 | 12/2002 | Takahashi et al. |
| 2003/0018718 A1 | 1/2003 | Maehiro |
| 2004/0002384 A1 | 1/2004 | Multerer et al. |
| 2004/0092313 A1 | 5/2004 | Saito et al. |
| 2004/0109023 A1 | 6/2004 | Tsuchiya |
| 2005/0209008 A1 | 9/2005 | Shimizu et al. |

FOREIGN PATENT DOCUMENTS

| | | |
|---|---|---|
| GB | 2388045 A | 11/2003 |
| JP | 10-319831 A | 12/1998 |
| JP | 10-333542 A | 12/1998 |
| JP | 11-319319 A | 11/1999 |
| JP | 2001-224865 A | 8/2001 |
| JP | 2002-346230 A | 12/2002 |
| JP | 2002-346232 A | 12/2002 |
| JP | 2002-346233 A | 12/2002 |
| JP | 2002-346234 A | 12/2002 |
| JP | 2003-91493 A | 3/2003 |
| JP | 3417936 B2 | 4/2003 |
| JP | 2003-304350 A | 10/2003 |
| JP | 2004-65956 A | 3/2004 |
| JP | 2004-267800 A | 9/2004 |
| WO | WO 03/103788 A1 | 12/2003 |

* cited by examiner

| PLAYER ID | CARD ID | INDIVIDUAL INFORMATION (CARD NAME, IMAGE IDENTIFIER, MESSAGE INFORMATION) — M |
| --- | --- | --- |
| | CARD ID | INDIVIDUAL INFORMATION (CARD NAME, IMAGE IDENTIFIER, MESSAGE INFORMATION) — M |
| PLAYER ID | CARD ID | INDIVIDUAL INFORMATION (CARD NAME, IMAGE IDENTIFIER, MESSAGE INFORMATION) — M |

| MESSAGE ID | MESSAGE DATA UNIT |
| --- | --- |
| MESSAGE ID | MESSAGE DATA UNIT |
| MESSAGE ID | MESSAGE DATA UNIT |

GAME SYSTEM AND METHOD FOR CONTROLLING GAME SYSTEM, GAME SERVER DEVICE THEREFOR, AND GAME DEVICE THEREFOR

TECHNICAL FIELD

The present invention relates to a game system in which a player is able to play a game with multiple players and to a method of controlling such a game system, and the present invention relates to a game server device therefor and to a game device therefor.

BACKGROUND ART

There are disclosed, in Japanese Patent Publication No. 3417936 and Japanese Patent Application Laid-Open Publication No. 2001-224865, game systems in which a player is able to play a game with multiple players. In these game systems, messages such as a player's quote (speech) and a player's self-introduction message are registered in advance in a game server device, thereby enabling a simulated chat in a game with multiple players. In the simulated chat, registered messages are delivered from a game server device to plural game devices so that the messages are displayed by each game device.

During the playing of a game, however, a player performs operations for the play. In a game requiring such operations frequently, it would be difficult for a player to perform operations for editing a message during play. Moreover, operations for the editing of a message are troublesome because a game device installed at a game arcade is usually not provided with a keyboard. As is obvious from the above, in a conventional system in which a registered message is delivered from a game server device to plural game devices every time the message is displayed, the same message is repeatedly transmitted. As a result, communication efficiency is likely to be degraded.

DISCLOSURE OF INVENTION

The present invention was made in consideration of the above, and the present invention has as objects to provide a game system that enables simulated chat without degrading communication efficiency, a method of controlling the game system, a game server device therefor, and a game device therefor.

In the following, description will be given of the present invention. It should be noted that reference numerals in the attached drawings are shown in parentheses to facilitate understanding of the present invention, but this is not intended to limit the present invention to the embodiments as shown in the drawings.

To solve the above-stated problems, in one aspect, a game system according to the present invention has a game server device (3) and plural game devices (1) by which, through communication with one another, enables players to play a game with multiple players as participants of the game for multiple players, the plural game devices being associated with one another. In this game system, the game server device (3) has a storage unit (33) that stores message information representing the contents of a message sent by each of the players in association with identification information identifying each of the players, and has a deliverer (31) that, upon receiving a message request containing identification information and requesting that message information associated with the identification information be transmitted as a response, reads from the storage unit (33) message information that is associated with the identification information contained in the message request and that transmits a message response containing the message information, the message response being a response to the message request, and each of the game devices (1) has a personal information storage unit (18) that stores information that has been written with respect to a player of the each game device; an opponent information storage unit (18) that stores information that has been written with respect to an opponent participant; a reader (13) that reads the identification information from an information recording medium (2) in which the identification information is recorded; a delivery requester (11, 17) that transmits, to the game server device (3), the message request containing the identification information read by the reader (13); a personal information writer (11, 17) that, upon receiving the message response, writes, in the personal information storage unit (18), the message information contained in the message response; a presharing unit (11, 17) that transmits the message information stored in the personal information storage unit (18) to an opponent participant; an opponent information writer (11, 17) that, upon receiving from an opponent participant, message information of the opponent participant, writes the message information of the opponent participant into the opponent information storage unit (18); a detector (11) that detects a predetermined event; an event processor (11, 15, 17) that, in a case in which the event is detected by the detector (11), performs a process of displaying a message having contents represented by the message information stored in the personal information storage unit (18) and performs a process of transmitting to an opponent participant a display request requesting that the message be displayed; and a display request processor (11, 15, 17) that, upon receiving from an opponent participant a display request of the opponent participant, displays a message having contents represented by the message information of the opponent participant stored in the opponent information storage unit (18).

According to this game system, each game device (1), upon detecting an event, performs a process of displaying a message represented by message information stored in the personal information storage unit (18) and performs a process of transmitting to an opponent participant a display request requesting that the message be displayed, and each game device (1), upon receiving from another game device (1) a display request of an opponent player, performs a process of displaying a message having contents represented by message information of the opponent participant stored in the opponent information storage unit (18). Since message information of a player who plays at the game device is stored in the personal information storage unit (18) and message information of an opponent participant is stored in the opponent information storage unit (18), a message of a player who uses a game device (1) will be displayed at the same game device (1) and at a game device (1) of an opponent participant. In other words, a simulated chat is enabled according to this game system.

Furthermore, each game device (1) stores message information of a player who uses the game device itself and message information of an opponent participant. Therefore, each game device can display a message by using stored message information in a case in which an event is detected or a display request is received, without obtaining message information from a game server device (3) every time a message is to be displayed. Thus, according to this game system, the degradation of communication efficiency can be prevented, which degradation of communication efficiency is likely to be caused by repeatedly transmitting the same message.

Furthermore, according to the game system, each game device (1) is enabled to communicate with another game device (1) without involving the game server device (3). Therefore, a simulated chat can be continued even in a case in which communication through the game server device (3) is disabled due to some problem which has occurred at the game server device (3) if it is after message information is stored in the personal information storage unit (18).

The above identification information is not necessarily information corresponding one to one with a player. For example, in a case in which information identifying each of plural information recording media (2) is stored in each information recording medium (2), the information can be used as identification information. In this situation, in a case in which a single player is allowed to have plural information recording media (2), the relationship between the player and identification information is one-to-multiple. Furthermore, identification information is not necessarily information directly identifying a player. Any information can be used as identification information as long as the identification information uniquely identifies a player.

In another aspect, a game server device (3) according to the present invention is for use in a game system that has the game server device (3) and plural game devices (1) which, through communication with one another, enable players to play a game with multiple players as participants of the game with multiple players, the plural game devices being associated with one another, in which each of the game devices (1) performs a process of reading, from an information recording medium (2), identification information for identifying each of the players and transmitting a message request containing the identification information and requesting that message information representing contents of a message sent by each player be transmitted as a response, performs a process of receiving a message response containing the message information, the message being a response to the message request, and writing the message information contained in the message response for storage into a personal information storage unit (18), performs a process of transmitting the message information stored in the personal information storage unit (18) to an opponent participant; performs a process of receiving, from the opponent participant, message information of the opponent participant and writing the message information of the opponent participant for storage into an opponent information storage unit (18), performs a process of detecting a predetermined event, and performs a process of, upon the event being detected, displaying a message having contents represented by the message information stored in the personal information storage unit (18) while transmitting to an opponent participant a display request requesting that the message be displayed, and a process of, upon receiving from an opponent participant a display request of the opponent participant, displaying a message having contents represented by message information of the opponent participant stored in the opponent information storage unit (18), and the game server device includes a storage unit (33) that stores the message information and the identification information in association with one another; and a deliverer (31) that, upon receiving the message request, reads from the storage unit (33) the message information that is associated with the identification information contained in the message request and that transmits the message response containing the message information, the message response being a response to the message request. According to a game system using this game server device (3), for the same reasons described above, a simulated chat is enabled, and the degradation of communication efficiency can be prevented, which degradation is likely to be caused by the same message being transmitted a number of times.

In still another aspect, a game server device (3) according to the present invention is for use in a game system that has the game server device (3) that transmits message information to each of plural game devices (1) which, through communication with one another, enable players to play a game with multiple players, in which a predetermined event takes place, as participants of the game with multiple players, the plural game devices being associated with one another and the message information representing contents of a message of one of the players who plays at one of the game devices, so that the message information is stored in the each game device, whereby, in a case in which the event takes place, the plural game devices (1) are enabled, by using the message information, to display a message corresponding to a game device that is a source of the event, the game system further having a terminal device (4) that is operated by one of the players, that specifies identification information unique to the one player, that receives the message information of the one player from the game server device (3) so that the one player is prompted to edit the message information, and that replies to the game server device with an edit result as update information, and the game server device (3) has a storage unit (33) that stores the message information and the identification information in association with each other; and an updater (31) that reads from the storage unit (33) the message information corresponding to the identification information specified by the terminal device (4) for transmission to the terminal device and that, upon receiving the update information from the terminal device (4), updates the message information stored in the storage unit (33) with the update information.

According to the game system using this game server device (3), a message corresponding to a source of an event is displayed at each game device (1). That is, according to this game system, a simulated chat is enabled. Furthermore, a message is displayed at each game device (1) by using message information stored in the same game device. Therefore, each game device (1) need not obtain message information from the game server device (3) every time it displays a message. Therefore, according to the game system, the degradation of communication efficiency can be prevented, which degradation is likely to be caused when the same message is transmitted a number of times. Furthermore, a player can edit and update message information stored in the game server device (3) by using a terminal device (4).

In one aspect, a game device (1) according to this invention is for use in a game system that has a game server device (3) and plural game devices (1) which, through communication with one another, enable players to play a game with multiple players as participants of the game with multiple players, the plural game devices being associated with one another, and the game server device (3) performing a process of storing message information representing contents of a message sent by each of the players and identification information that identifies each player, with the message information and the identification information being stored in association with each other, and the process including, upon receiving a message request containing the identification information, with the message request requesting that the message information corresponding to the identification information be transmitted as a response, transmitting a message response containing the message information corresponding to the identification information contained in the message request, the message response being a response to the message request, and the game device has a personal information storage unit (18) that stores information that has been written with respect to a player of the game device; an opponent information storage area (18) that stores information that has been written with respect to an opponent participant; a reader (13) that reads the identification information from an information recording medium (2) in which the identification information is recorded; a delivery requester that transmits the message request containing the identification information read by the reader (13) to the game server device (3); a personal information writer (11, 17) that, upon receiving the message response, writes in the personal information storage unit (18) the message information in the message response; a presharing unit (11, 17) that transmits the message information stored in the personal information storage unit (18) to the opponent participant; an opponent information writer (11, 17) that, upon receiving from an opponent participant, message information of the opponent participant, writes the message information of the opponent participant into the opponent information storage unit; a detector (11) that detects a predetermined event; an event processor (11, 15, 17) that, in a case in which the event is detected by the detector (11), performs a process of displaying a message having contents represented by the message information stored in the personal information storage unit and a process of transmitting to an opponent participant a display request requesting that the message be displayed; and a display request processor (11, 15, 17) that, upon receiving from an opponent participant the display request, displays a message having contents represented by the message information stored in the opponent information storage unit (18).

According to a game system having a plurality of these game devices (1), for the same reasons described above, a simulated chat is enabled, the degradation of communication efficiency can be prevented, which degradation is likely to be caused when the same message is transmitted a number of times, and a simulated chat can be continued even in a case in which communication through a game device (3) is disabled due to some problem that has occurred at the game server device (3) if it is after message information is stored in the personal information storage unit (18).

Preferably, in the above game device (1), in a case in which there is a plurality of the predetermined events, the message information may contain, for each of the players, a pair of an identifier identifying each of the events and a message data unit representing contents of a message, and the event processor (11, 15, 17), in a case in which one of the events is detected by the detector (11), may perform a process of displaying a message having contents represented by the message data unit that is in a pair with the identifier corresponding to the detected event and performs a process of transmitting to an opponent participant a display request containing the identifier and requesting that the message be displayed, the display request processor (11, 15, 17), upon receiving from an opponent participant a display request of the opponent participant, displays a message having contents represented by a message data unit of the opponent participant that is stored in association with the opponent participant in the opponent information storage unit (18) and is in a pair with the identifier contained in the display request. According to a game system having a plurality of these game devices (1), in a case in which an event is detected, a message having contents represented by a message data unit corresponding to the detected event is displayed at each game device (1). Therefore, it is possible to display a message that is suitable for a situation of each game device (1) (e.g., a play situation of each player) at plural game devices (1).

In another preferred embodiment of the above game device, each game device (1) may further include an inputter that is operated by a player and that receives an instruction input by the player, and the predetermined event may be a receiving event of a predetermined instruction at the inputter. According to the game system having a plurality of these game devices (1), a message of a player can be displayed at a game device (1) of the player and at a game device (1) of an opponent player by a player's operating an inputter to input a predetermined instruction.

Preferably, in the game device (1) first mentioned, the presharing unit (11, 17) may transmit, to an opponent participant, the message information stored in the personal information storage unit (18) and a communication address of the game device, the opponent information writer (11, 17) may receive, from an opponent participant, message information and a communication address of the opponent participant and write the message information and the communication address in the opponent information storage unit (18); and the display request processor (11, 15, 17), upon receiving from an opponent participant a display request of the opponent participant, may display a message having contents represented by the message information stored, in the opponent information storage unit (18), in association with a communication address of a sender of the display request. According to the game system having a plurality of these game devices (1), a message corresponding to a communication address of a sender of a display request is displayed at each game device (1), and a player can therefore distinguish a player who has sent a message even in a case in which there is a plurality of opponent participants.

In another aspect, the present invention provides a method of controlling a game system that has a game server device (3) and plural game devices which, through communication with one another, enable players to play a game with multiple players as participants of the game with multiple players, the plurality of game devices (1) being associated with one another, and the method having steps of: storing, at the game server device (3), message information representing contents of a message sent by each of the players and identification information identifying each player in association with each other; reading, at the game device (1), the identification information from an information recording medium (2) carried by the player and transmitting from the game device a message request containing the identification information and requesting that the message information corresponding to the identification information be transmitted as a response; receiving at the game server device (3) the message request and transmitting a message response containing the message information corresponding to the identification information contained in the message request, the message response being a response to the message request; performing at the game device (1) a process of receiving the message response and writing in a personal information storage unit the message information contained in the message response for storage and performing a process of transmitting the message information stored in the personal information storage unit to an opponent participant, while performing a process of receiving, from an opponent participant, message information of the opponent participant and writing the message information of the opponent participant in an opponent information storage unit (18) for storage; and performing at the game device (1) a process of detecting a predetermined event and displaying a message having contents represented by the message information stored in the personal information storage unit (18) and performing a process of transmitting to an opponent participant a display request requesting that the message be displayed, while performing a process of, upon receiving from an opponent participant a display request of the opponent participant, displaying a message having contents represented by the message information of the opponent participant stored in the opponent information storage unit (18).

According to this method of controlling the game system, for the same reasons described above, a simulated chat is enabled, the degradation of communication efficiency can be prevented, which degradation is likely to be caused when the same message is transmitted a number of times, and a simulated chat can be continued even in a case in which communication through a game device (3) is disabled due to some problem that has occurred at the game server device (3) if it is after message information is stored in the personal information storage unit (18).

Preferably, in this method of controlling the game system, it may be before a play of the game with an opponent participant is started when the game device (1) writes the message information contained in the message response into the personal information storage unit (18) and when the game device writes in the opponent information storage unit (18) the message information of the opponent participant of the opponent information in association with the communication address of the opponent information, and it may be during a play of the game with the opponent participant when the detector (11) detects the event. According to this method of controlling the game system, the exchange of messages is completed before a play is started, and data transmitted or received during a play relating to message information is a message request only. Therefore, when compared with a case in which message information is transmitted and received during play, communication resources to be reserved for the exchange of message information can be reduced during play.

BEST MODE FOR CARRYING OUT THE INVENTION

Figure 1:
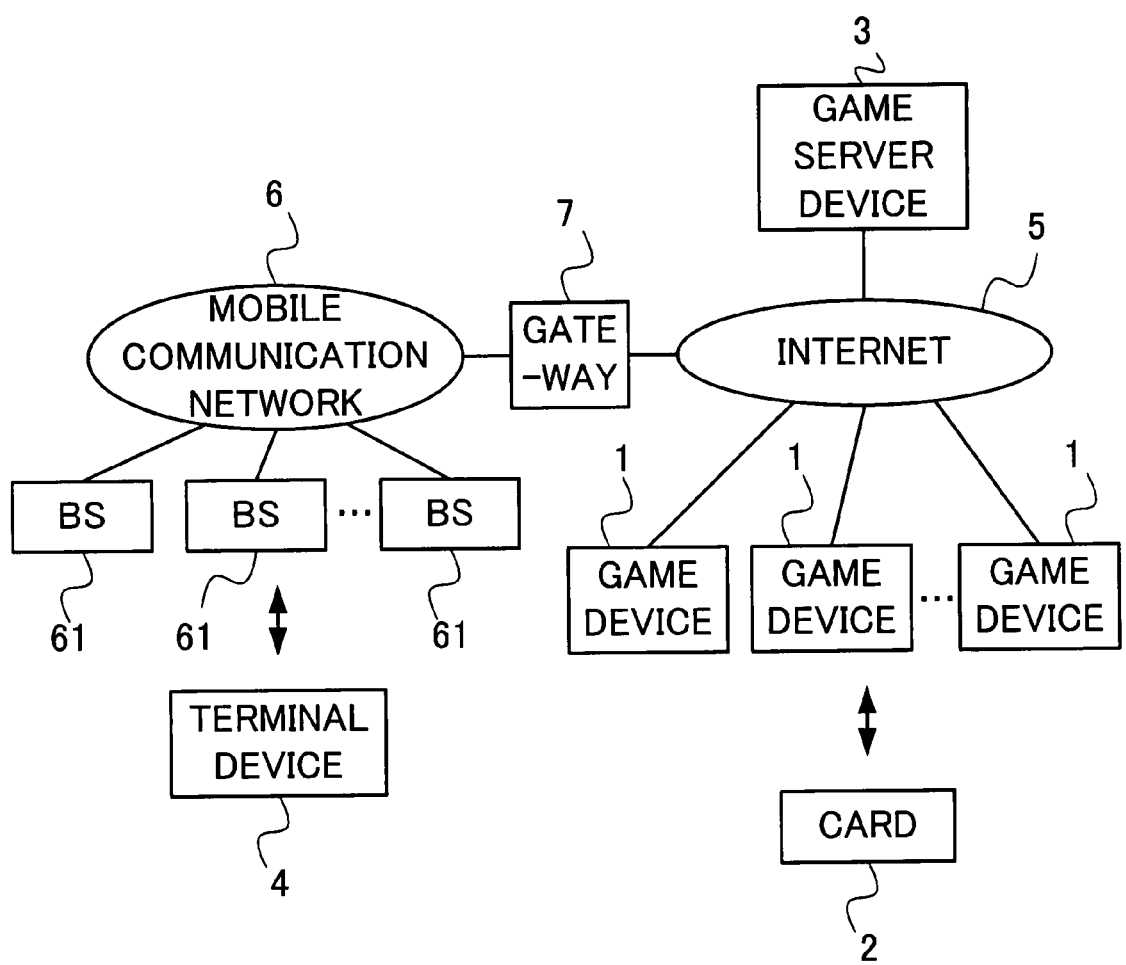
FIG. 1 is a block diagram showing a communication system that is provided with a game system according to an embodiment of the present invention.

Overall Configuration:

FIG. 1 is a block diagram showing a communication system that is provided with a game system according to an embodiment of the present invention. The communication system has a large number of game devices 1, a large number of cards 2, a game server device 3 connected to the Internet 5, and a large number of terminal devices 4. This game system has plural game devices 1, from among the large number of game devices 1, that are mutually associated with one another as participants of a game with multiple players, and the game system has the game server device 3. In the game system, the plural game devices 1 mutually communicate with one another, so that the players of the game devices are able to play a game with multiple players.

Game device 1 is a terminal that enables a player to play a predetermined game by paying a fee. Game device 1 is connected to the Internet 5 and is capable of performing data communication with game server device 3 through the Internet 5. One or more game devices 1 are installed at a shop or a venue (game arcade) where visitors are able to use game devices 1. A player operates a game device 1 that the player is using, to thereby play a game with multiple players.

Card 2 is a portable information recording medium that magnetically records information, and it records a card ID (identification information) identifying the card itself. Although described later in detail, the card ID is read by game device 1 and is used at game server device 3. A player can own one or more cards 2 and can select one of that player's own cards 2 for use in a play of a game with multiple players.

Game server device 3 is a computer that retains individual information of players. Although described later in detail, individual information includes message information representing contents of messages such as quotes used by a player in a game with multiple players. Game server device 3 may include a single computer or plural functionally dispersed, network-connected computers. Game server device 3 is capable of performing data communication with a correspondent device via the Internet 5.

Terminal device 4 is a computer that, by being operated by a player, edits and updates message information retained at game server device 3, and the terminal 4 functions as a portable telephone capable of using, via base stations (BS) 61, a mobile communication network 6 which provides data communication and telephone communication services. Base stations 61 are dispersed so as to cover a service area of mobile communication network 6 in cooperation with one another, and each base station 61 is capable of wirelessly communicating with terminal device 4 located within an area which each base station 61 covers. Mobile communication network 6 is connected to the Internet 5 through a gateway 7 and is capable of providing a mobile internet access service. The "mobile internet access service" is a service that enables interactive communication between a mobile communication terminal such as a portable telephone service and a website on the Internet. According to this service, a mobile communication terminal is able to display characters and images provided from the site on its display and also to download an application program from the site. Examples of mobile internet access services include, for example, an "i-mode®" service developed by NTT DoCoMo Inc., Tokyo, Japan, and a service in accordance with a "WAP (Wireless Application Protocol)" developed by the WAP Forum. Gateway 7 converts a communication protocol of mobile communication network 6 into that of the Internet 5, and vice versa. Specifically, gateway 7 is, for example, an i-mode server in the i-mode service or a WAP proxy (WAP gateway) in the WAP service. Each terminal device 4 is capable of performing data communication with game server device 3 via mobile communication network 6 and the Internet 5.

Figure 2:
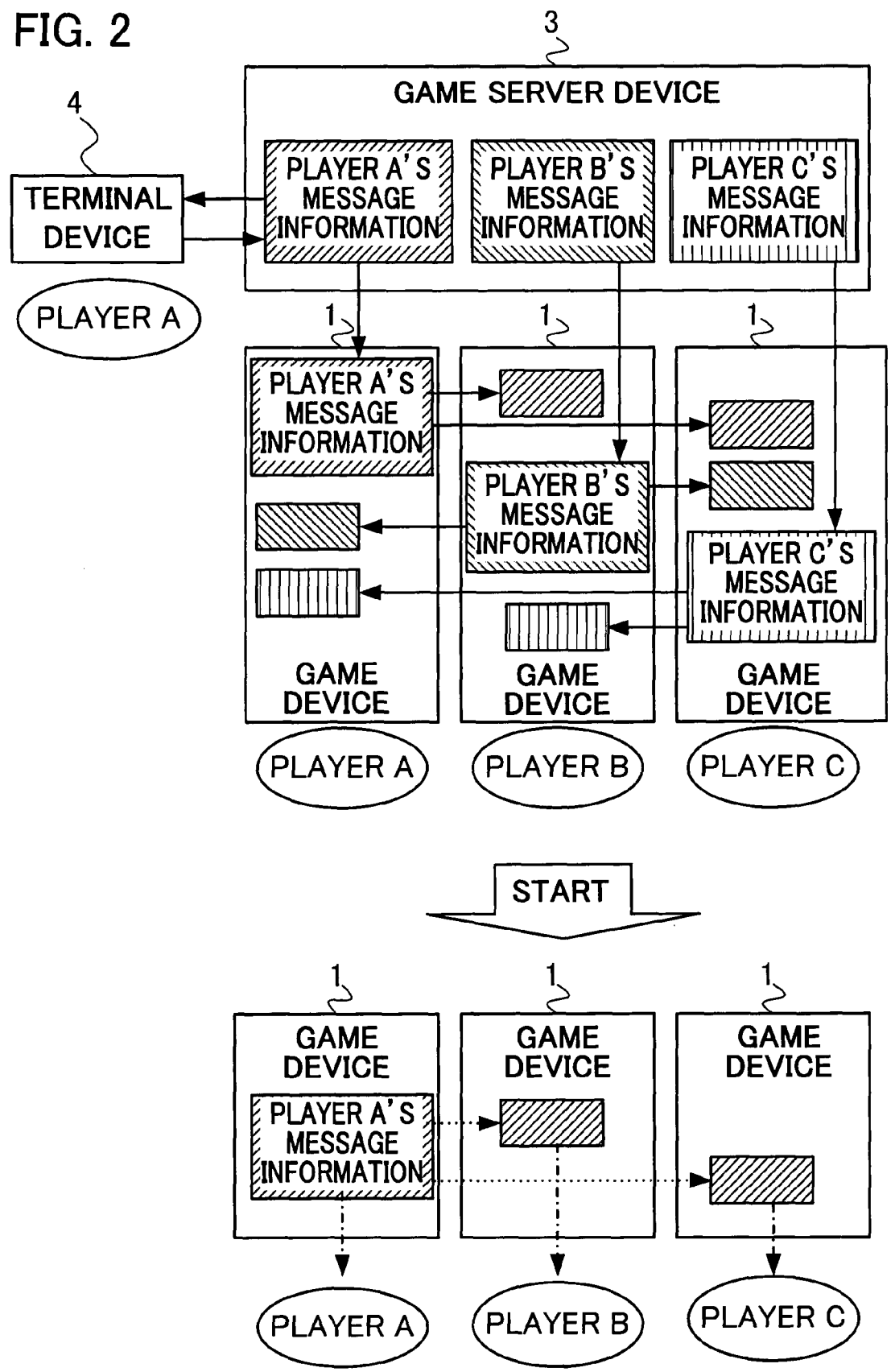
FIG. 2 is a state transition diagram showing operations of the communication system of FIG. 1 in a simplified manner.

Overview:

FIG. 2 is a state transition diagram showing operations of the communication system of FIG. 1 in a simplified manner.

As described above, there is retained message information in game server device 3, and a player is able to use terminal device 4 of the player and to edit and update message information of the player. There is shown in the figure an example of Player A's editing message information of the player. The editing can be performed in an optional period as long as relevant message information is retained in game server device 3. The editable period varies depending on operations of game device 1 and game server device 3. In the following, description will be given of the operations, focusing on a case in which Players A to C play the same game with multiple players.

Before the start of the game with multiple players, message information of Player A retained in game server device 3 is delivered to game device 1 used by Player A for storage therein. The message information is then delivered from Player A's game device 1 to each of game devices 1 used by the other two players so as to be stored in each game device 1. In the same way, message information of Player B is shared among the three game devices 1, and message information of Player C is shared among the three game devices 1. Thus, message information respectively of Players A to C is shared among the three game devices 1.

After the game with multiple players is started, each game device 1 attempts to detect various events that are predetermined. It is now assumed that one of the events is detected at game device 1 used by Player A. This game device 1 displays a message represented by message information of Player A stored therein, whereas the game device 1 requests the other two game devices 1 to display the same message. Each of the other two game devices 1, upon receiving the request, displays the message represented by message information of Player A stored therein. The message of Player A is thus conveyed to Players B and C.

Figures 3, 4, 5:
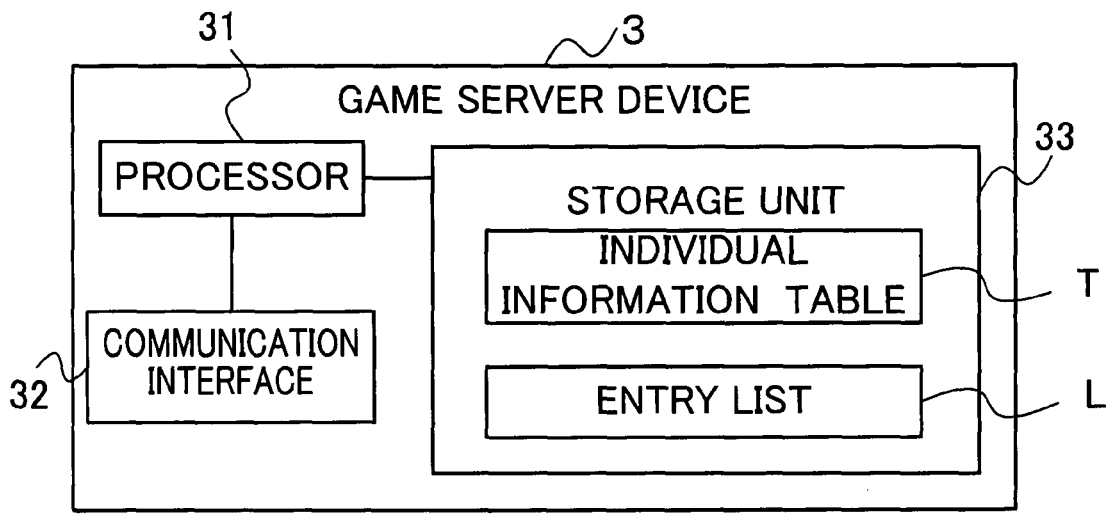
FIG. 3 is a block diagram showing a configuration of a game server device of the communication system of FIG. 1.
FIG. 4 is a diagram showing a data structure of an individual information table stored in the game server device of FIG. 3.
FIG. 5 is a diagram showing a data structure of message information in the individual information of FIG. 4.

Configuration of Game Server Device 3:

FIG. 3 is a block diagram showing a configuration of game server device 3.

Game server device 3 manages individual information of players and has a CPU (central processing unit) 31, a communication interface 32, and a storage unit 33. Communication interface 32 relays data between processor 31 and the Internet 5, and processor 31 communicates with game device 1 through communication interface 32. Storage unit 33 has a ROM (Read Only Memory) in which an IPL (Initial Program Loader) is written, has a RAM (Random Access Memory) used as a work area, and has a hard disk in which an individual information table T and an entry list L are stored. On the hard disk, there has been written a program that guides various processes described below. Processor 31 reads the IPL from ROM for execution, to thereby read the program from the hard disk for execution. In the following description on operations, it is assumed that the program has already been executed.

FIG. 4 is a diagram showing a data structure of the information table T stored in the game server device of FIG. 3.

There have been stored in the information table T a pair of a player ID (integrated identification information) and a card ID in association with individual information. The player ID is an identifier unique to a player and is assigned to the player by a game operator in advance. Individual information is associated with a pair of a player ID and a card ID so as to enable a single player to use more than one card. A plurality of card IDs therefore can be associated with one player ID. It is certainly possible to configure the system so that a single card ID is associated with a single player ID. In this case, either a player ID or a card ID alone may be used. In either case, the fact remains that a card ID is information identifying a player because a player ID is uniquely determined when a single card ID is identified. Individual information is information relating to a player and includes a card name, an image identifier, and message information M. The card name may be a nickname which the player has given to the card and is used as a player name in the game with multiple players. The image identifier may be an identifier of a character image which is displayed as a visual image of the player in the game with multiple players, and the image identifier is specified by the player in advance.

FIG. 5 is a diagram showing a data structure of message information M for one card ID in the individual information table of FIG. 4.

Message information M for one card ID has a structure in which plural message data units are associated with message IDs identifying each of the plurality of message data units. Each message data unit is text data representing contents of a message and is used when displaying the message. In the present embodiment, the number of messages contained in the message information M for one card ID is 7, which is the same as the number of types of events described later.

Figure 6:
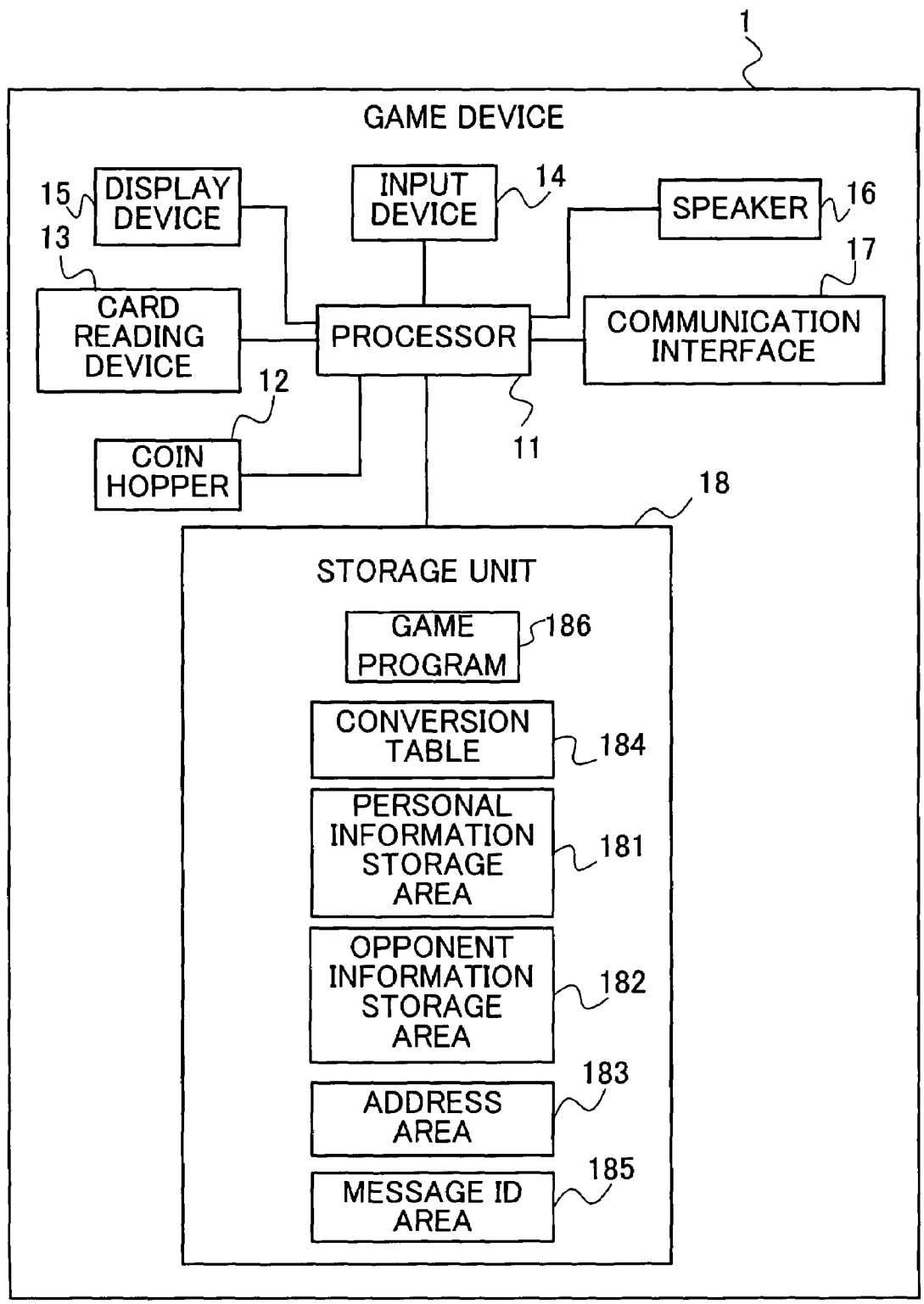
FIG. 6 is a block diagram showing a configuration of the game device of the communication system of FIG. 1.

Configuration of Game Device 1:

FIG. 6 is a block diagram showing a configuration of game device 1 of the communication system of FIG. 1. Game device 1 has a processor 11, a coin hopper 12, a card reading device (reader) 13, an input device (inputter) 14, a display device 15, a speaker 16, and a communication interface 17, and a storage unit 18.

Coin hopper 12 distinguishes coins inserted through a coin acceptance slot (not shown) formed on a body of game device 1, and the hopper accepts a coin if the coin is of a predetermined type and supplies a coin acceptance signal to processor 11. The predetermined type of coin is something which has a value corresponding to a game play charge with one or more pieces and is, for example, hard currency (money).

There is formed in card reading device 13 a card acceptance slot (not shown) for inserting a card 2. Card reading device 13, when card 2 is inserted from the card acceptance slot, reads a card ID from card 2 to supply a signal indicating the card ID to processor 11.

Input device 14 has plural operators, and when an operator is operated, supplies processor 11 with a signal that is unique to the operator.

Display device 15 displays a game start screen and a game screen after receiving image data from processor 11. Description will now be given of the game start screen and the game screen.

Figure 7:
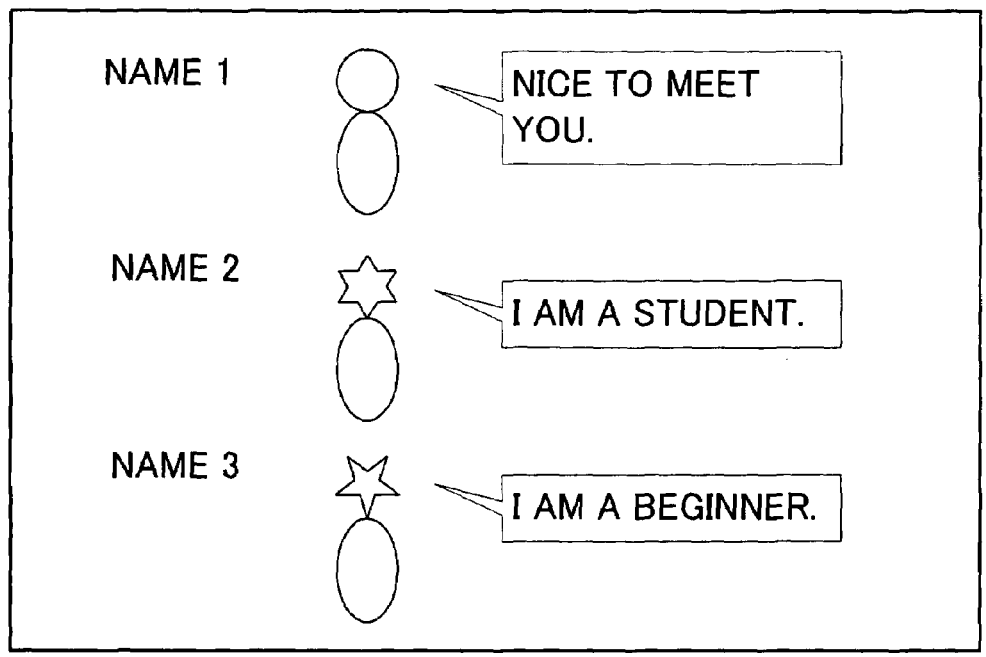
FIG. 7 shows an example of a game start screen displayed at the game device of FIG. 6.

FIG. 7 is a diagram showing an example of a game start screen displayed on display device 15.

The game start screen is a screen that is displayed at the start of a game with multiple players, and the start screen has an area for each of players who will play a game with multiple players about to be started. In each area, a player name, a reduced image of a character image, and a self-introduction message are positioned. The player name is a name of a player and is identical to a card name of card 2 used in the play. The self-introduction message is a type of a message and is displayed upon detecting the start of a game with multiple players.

Figure 8:
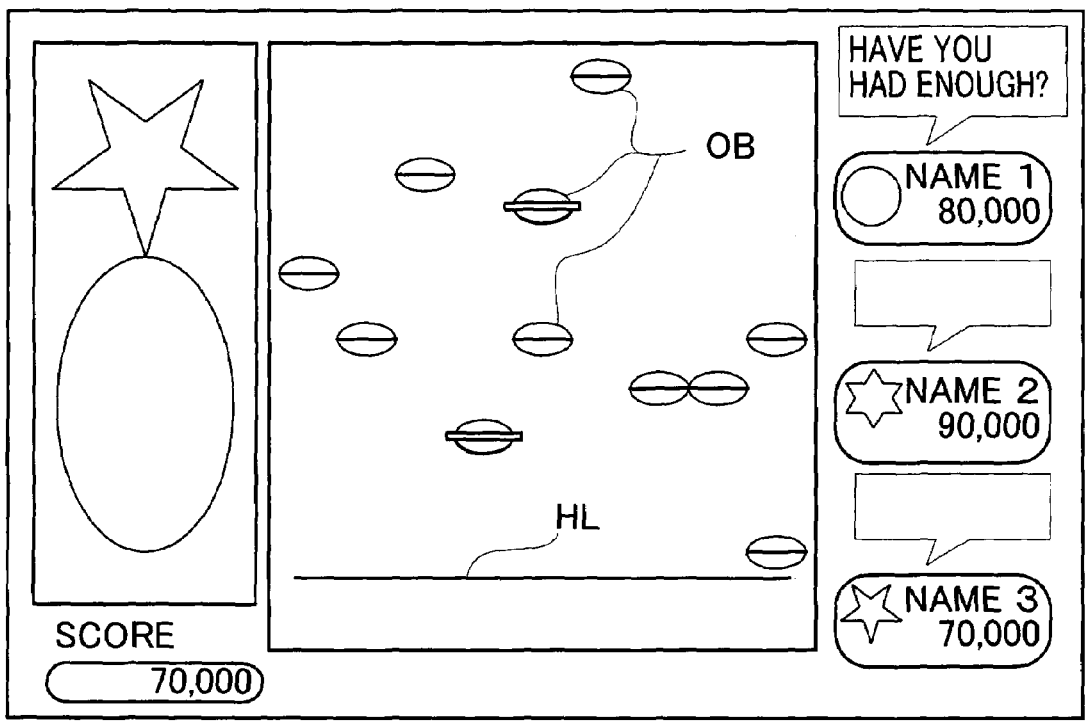
FIG. 8 shows an example of a game screen displayed at the game device of FIG. 6.

FIG. 8 is an example of a game screen displayed on display device 15.

A play of a game with multiple players starts when a play of a music piece is started, and the game ends when the music ends. There is positioned, in a central portion of the game screen displayed during the play, an image showing how objects OB appear in an upper portion of the figure, fall, and disappear in a lower portion of the figure to the music. There exists, slightly above a point at which objects OB disappear, a horizontal line HL orthogonal to a falling direction of objects OB. A player should operate a play button corresponding to a current position of an object OB at a time in which the object OB overlaps with the horizontal line HL, and in a case in which the player does so, this game device 1 outputs a sound corresponding to the object OB. A selected music piece is more accurately reproduced if a player's operation is performed at a more suitable timing and with a more suitable content.

In the lower portion of the game screen, there are shown images indicating current conditions of a play such as the player's score. The score is increased when an appropriate operation is performed at an appropriate timing. Specifically, the score increases if, when an object OB overlaps with the horizontal line HL, an operation corresponding to the object OB is performed. In a case in which a particular type of an object OB overlaps the horizontal line HL and an operation corresponding to the object OB is performed, an attack (interference) is made on an opponent participant, the type of the attack corresponding to current or previous situations of the play.

In the left portion of the game screen, there is shown a character image selected from among a prepared set of plural candidates, the selection being made by a current player of the game device. In the right portion of the game screen, an area is reserved for displaying a player name, a current score, a current quote, and a partial image of a character image for each of the player and the other players of the game that is being played. In a case in which the above message is a quote, a player's message is displayed in an area reserved for the same player. A partial image of the character image is obtained by clipping a part from a reduced image of a character image selected by a participant of a game being played.

The description now returns to the configuration of game device 1.

Speaker 16 outputs sounds after receiving music sound signals from processor 11.

Communication interface 17 is connected to the Internet 5 directly or via a relay device such as a router and relays data between processor 11 and the Internet 5.

Storage unit 18 has a nonvolatile memory such as a ROM (Read Only Memory) and has a rewritable memory such as a RAM (Random Access Memory).

In the rewritable memory, there are held a personal information storage area 181, an opponent information storage area 182, an address area, and a message ID area 184. Personal information storage area 181 is a memory area for storing individual information of a player currently using this game device 1. Opponent information storage area 182 is a memory area for storing individual information of an opponent participant and for storing a communication address of game device 1 that is being used by the another player. Address area 183 is a memory area for storing a communication address of this game device 1. For example, an IP (Internet Protocol) address and a port number are used as a communication address. In a case in which a fixed IP address is assigned, address area 183 should be reserved in a nonvolatile memory. Message ID area 185 is a storage area for storing, for each of the other participants, a message ID to be displayed and to be transmitted.

There has been written in the nonvolatile memory a conversion table 184. Conversion table 184 associates an event ID for identifying each of plural predetermined types of events with the above message ID. A message ID is uniquely determined when one event ID is specified. Predetermined events to be detected at game device 1 include an event in which a game with multiple players was started, an event in which a player of this game device 1 played well, an event in which the player played poorly, an event in which the player made an attack, an event in which the player was attacked and damaged, an event in which the player won the game, and an event in which the player lost the game.

There has been written in the nonvolatile memory a game program 186. Processor 11 executes game program 186, so as to thereby guide an authentication process, a message identifying process, a message displaying process, a transmission process, and a receiving process, which will be described later in the specification. In a game with multiple players, the above conversion table 184 is used to convert an event ID into a message ID. In the description of operations below, it is assumed that game program 18 has already been executed.

Figure 9:
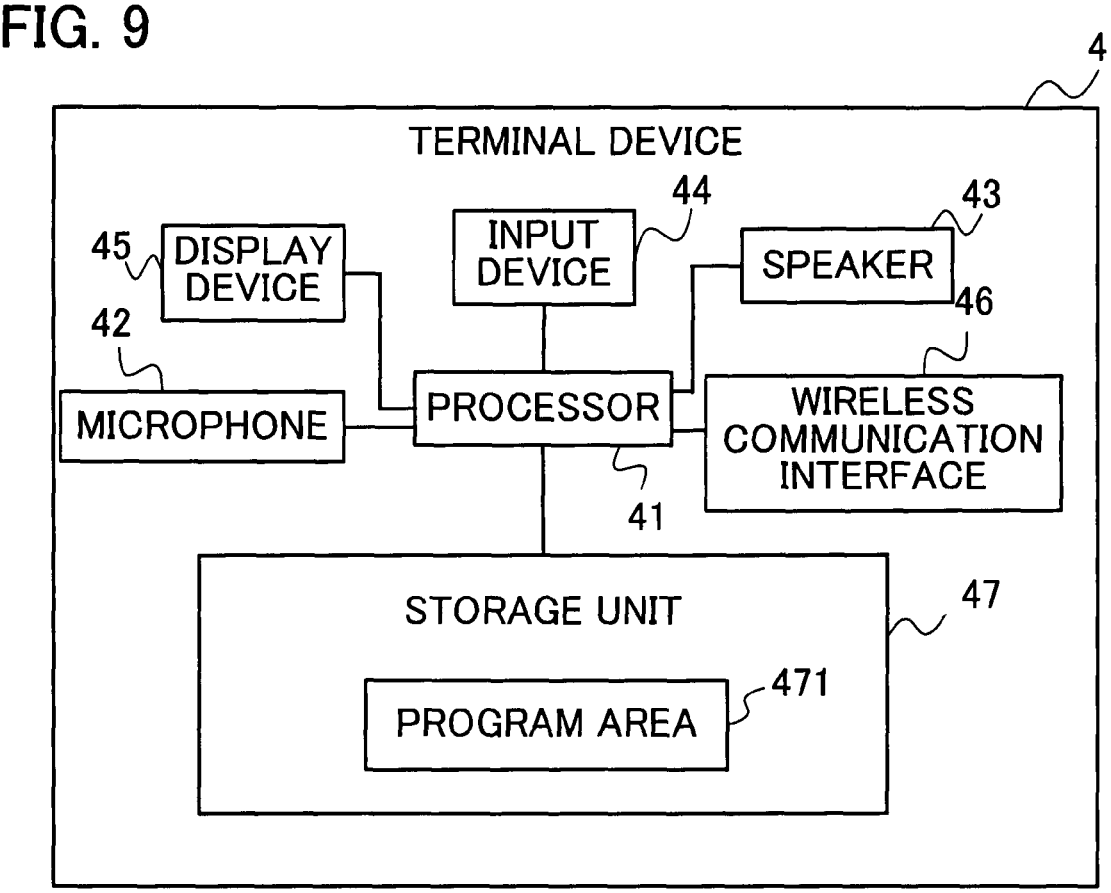
FIG. 9 is a block diagram showing a configuration of a terminal device of the communication system of FIG. 1.

Configuration of Terminal Device 4:

FIG. 9 is a block diagram showing a configuration of terminal device 4 of the communication system of FIG. 1.

Terminal device 4 has a processor 41, a microphone 42, a speaker 43, an input device (inputter) 44, a display device (display) 45, a wireless communication interface 46, and a storage unit 47. It should be noted that this configuration is adopted because terminal device 4 functions as a portable telephone as described above. The present invention can be implemented in an embodiment in which another computer (e.g., a personal computer) is used as a terminal device. In this case, the configuration of the terminal device is not entirely the same as the above configuration of terminal device 4 in which it is a portable phone.

Microphone 42 is used for voice communication, and it picks up voice sounds of a user and supplies the picked up sounds to processor 41.

Speaker 43 is used for voice communication, and it outputs sounds after receiving voice sound signals from processor 41.

Input device 44 has plural buttons operated by a user, and when a button is pressed down, it supplies a signal unique to the pressed button to processor 41. The plurality of buttons includes a button used for inputting data and a button used for inputting instructions.

Display device 45 displays an edit screen after receiving image data from processor 41.

Wireless communication interface 46 relays data between processor 41 and base stations 61. Communication paths between wireless communication interface 46 and base stations 61 are wireless communication paths.

Storage unit 47 has a RAM, ROM, and EEPROM (Electrically Erasable Programmable ROM). There is stored in the ROM an operating system of terminal device 4, and the operating system is executed when terminal device 4 is started. This operating system is for providing terminal device 4 with a telephone communication function and a data communication function, a function of downloading other programs from the Internet 5, and a function of executing a downloaded program. There is reserved in EEPROM a program area 471 for storing downloaded programs. In program area 471, a control program that guides an edit process described below is stored. In the description of operations below, it is assumed that the control program has already been executed. Examples of control programs that can be downloaded by the mobile internet access service and that can be executed by a portable telephone terminal are as follows: i-appli® for i-mode compatible portable terminals, an application program operable at a portable terminal in accordance with BREW® (Binary Runtime Environment for Wireless) developed by Qualcomm Incorporated, San Diego, Calif., USA, and an application program operable at a portable terminal in accordance with MIDP (Mobile Information Device Profile) for J2ME® CLDC (Java® 2 Micro Edition Connected Limited Device Configuration).

Operations:

In the following, description will be given of operations of the communication system having the above configuration.

Description will first be given of an operation performed in a case in which a single player edits and updates individual information (message information M) retained in game server device 3, and subsequently of an operation performed in a case in which Players A to C play the same game with multiple players. In the description of the former case, it is assumed that individual information is edited and updated for a card ID which has already been registered at game server device 3.

Figure 10:
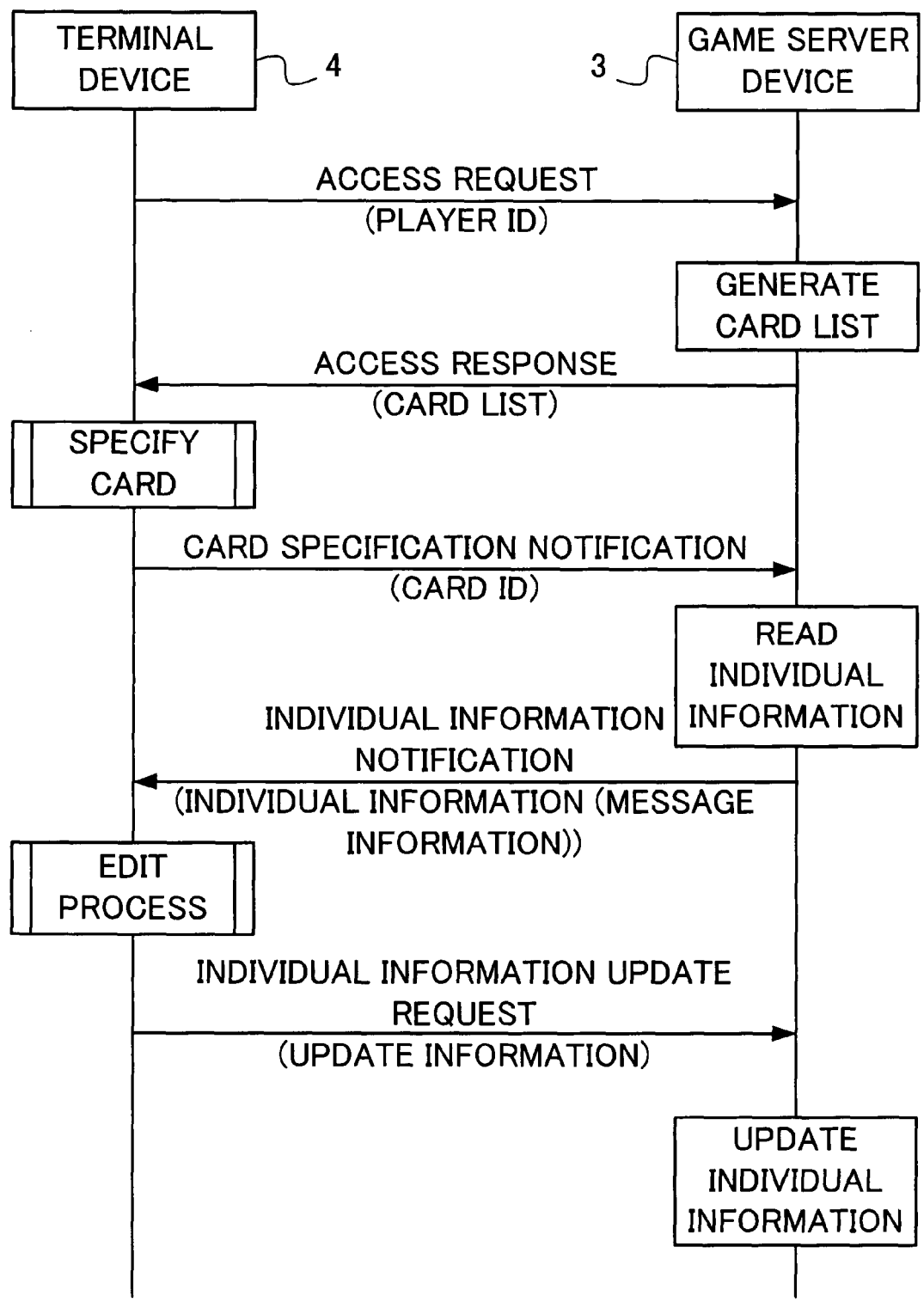
FIG. 10 is a diagram showing a flow of an operation for editing and updating individual information, the operation being performed at the game server device and the terminal device of the communication system of FIG. 1.

Operations for Editing and Updating:

FIG. 10 is a diagram showing a flow of an operation for editing and updating individual information, the operation being performed at game server device 3 and one terminal device 4 of the communication system of FIG. 1.

Processor 41 of terminal device 4 transmits to game server device 3 an access request containing a player ID and requesting transmission of a card list as a response. The player ID contained in the access request is registered in advance in game server device 3 by a player when a program is downloaded from game server device 3 to program area 471. Processor 31 of game server device 3, upon receiving the access request, reads from individual information table T all the card IDs and card names that are associated with the player ID contained in the access request, generates a card list showing pairs of card IDs and card names that have been read, and replying to terminal device 4 with an access response containing the card list and being a response to the access request.

Processor 41 of terminal device 4, upon receiving the access response, causes pairs of a card ID and a card name contained in the access response to be displayed on display device 45, for prompting the player to specify one of the card IDs. When the player then operates input device 44 to input an instruction of specifying a card ID, processor 41 transmits a card specification notification containing the specified card ID to game server device 3. Processor 31 of game server device 3, upon receiving the card specification notification, reads from individual information table T individual information corresponding to the card ID contained in the card specification notification, to transmit an individual information notification containing the individual information to terminal device 4.

Processor 41 of terminal device 4 performs an edit process upon receiving the individual information notification. Specifically, an edit screen for editing message information M contained in the individual information notification is caused to be displayed at display device 45, the edit screen prompting the player to edit and update individual information.

Figure 11:
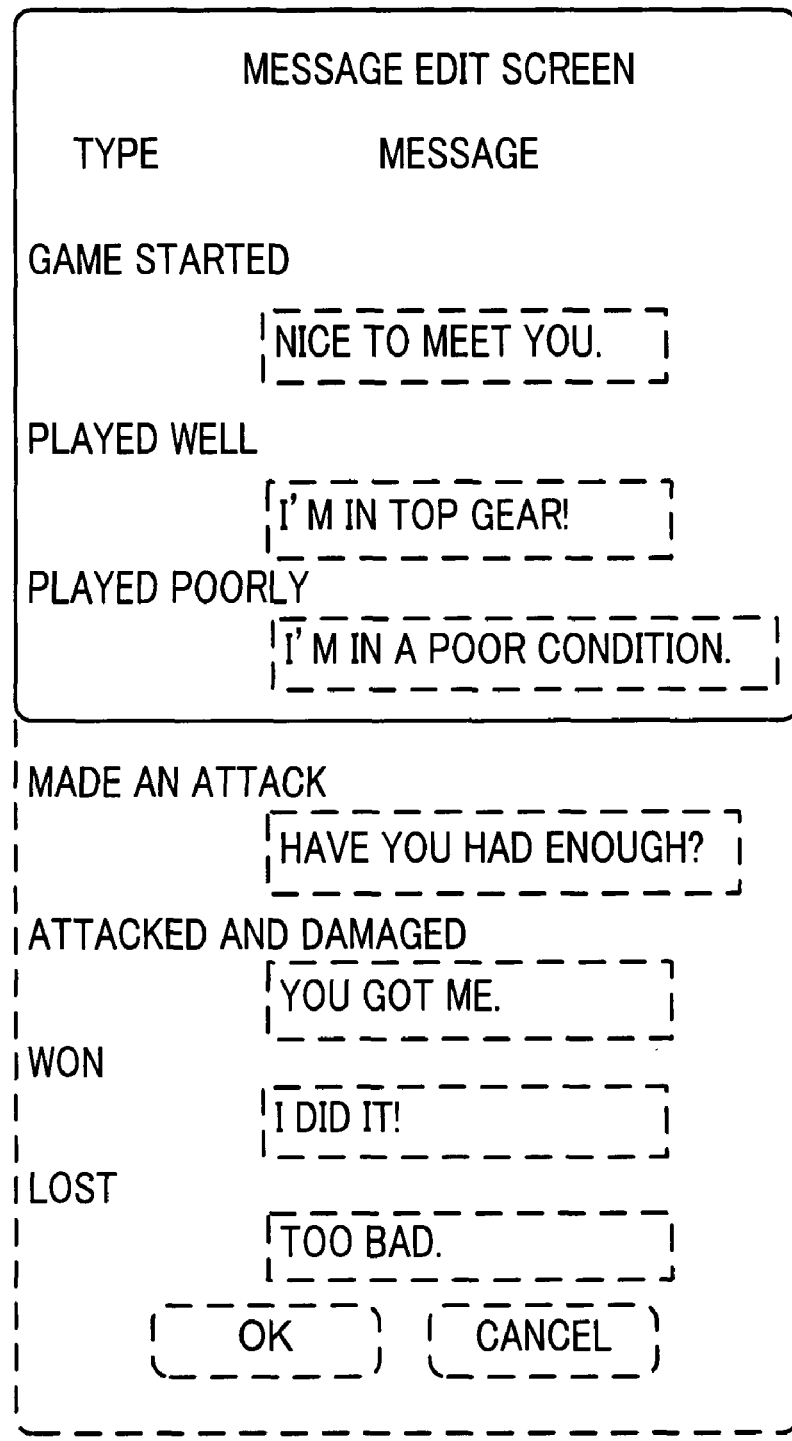
FIG. 11 is a diagram showing an example of an edit screen displayed at the terminal device of FIG. 9.

FIG. 11 shows an example of an edit screen displayed at a terminal device of FIG. 9. On the editing screen, types of events and messages represented by message data units are displayed in association with each other, the types of events and the messages data units corresponding to the message ID of the message information M.

After the above editing process is performed, when the player operates input device 44 to input an instruction by selecting an "OK" button, processor 41 regards individual information containing post-edit message information as update information, and transmits to game server device 3 an individual information updating request containing the updated information and requesting the updating of individual information. Processor 31 of game server device 3, upon receiving the individual information updating request, overwrites the corresponding individual information with the update information contained in the individual information updating request. The individual information is thus updated.

Operations for Playing a Game with Multiple Players:

Operations for playing a game with multiple players are broadly divided into an operation of each game device 1 for obtaining individual information, a subsequent operation up to the start of a game with multiple players, and a subsequent operation up to the end of the game with multiple players.

Figure 12:
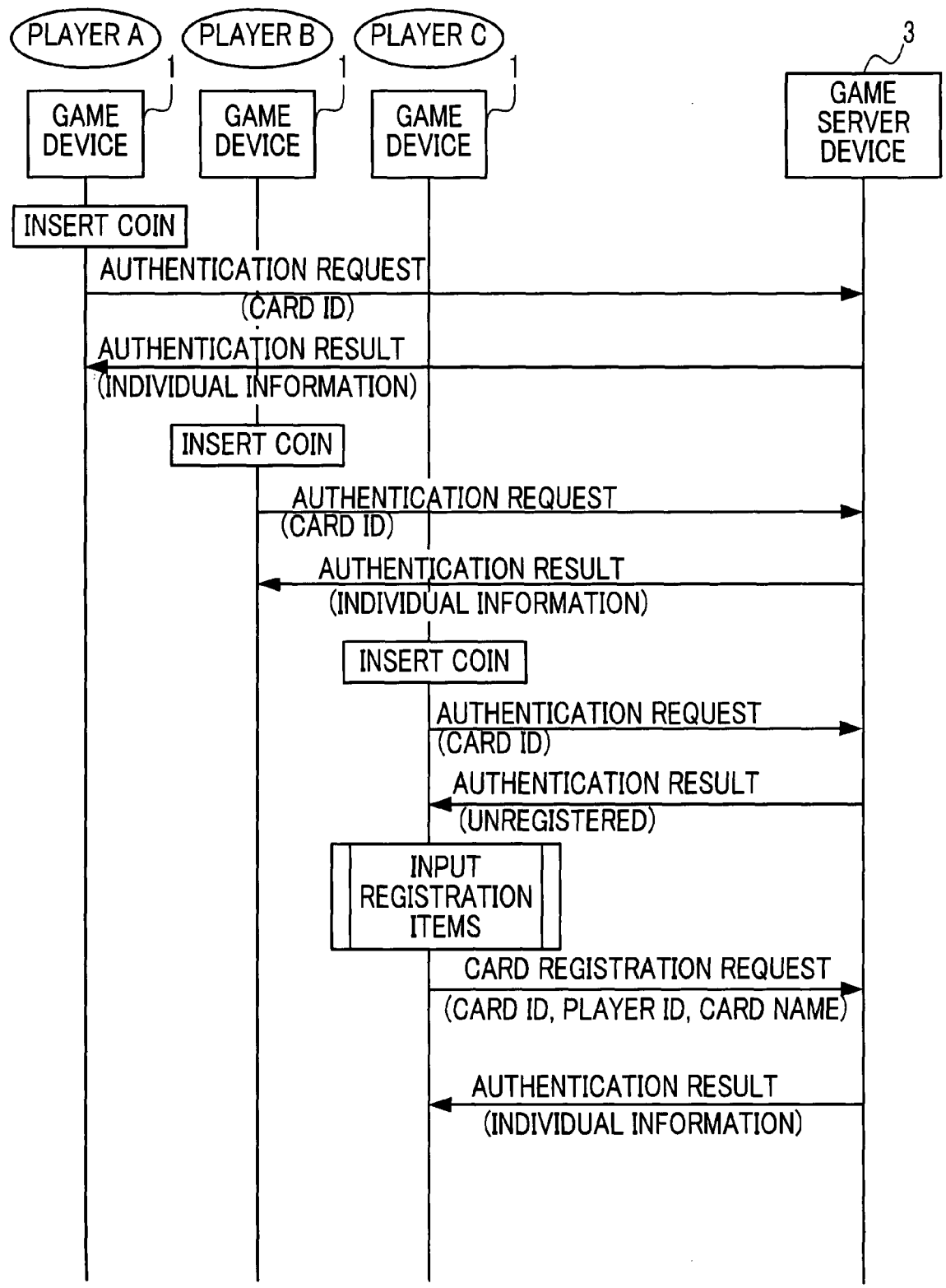
FIG. 12 is a diagram showing an operation performed by a game device for obtaining, from a game server device, individual information of a player who uses the game device in the communication system of FIG. 1.
Figure 13:
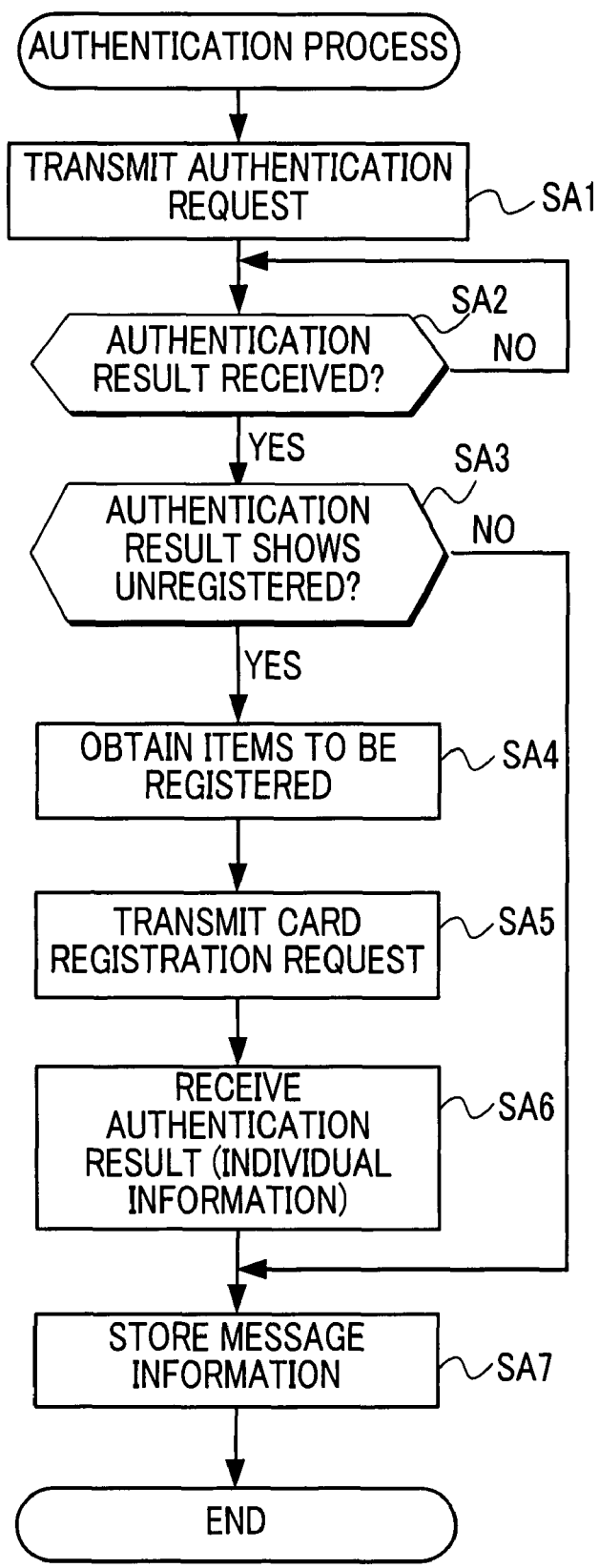
FIG. 13 is a flow chart showing an authentication process performed by a game device in the communication system of FIG. 1.
Figure 14:
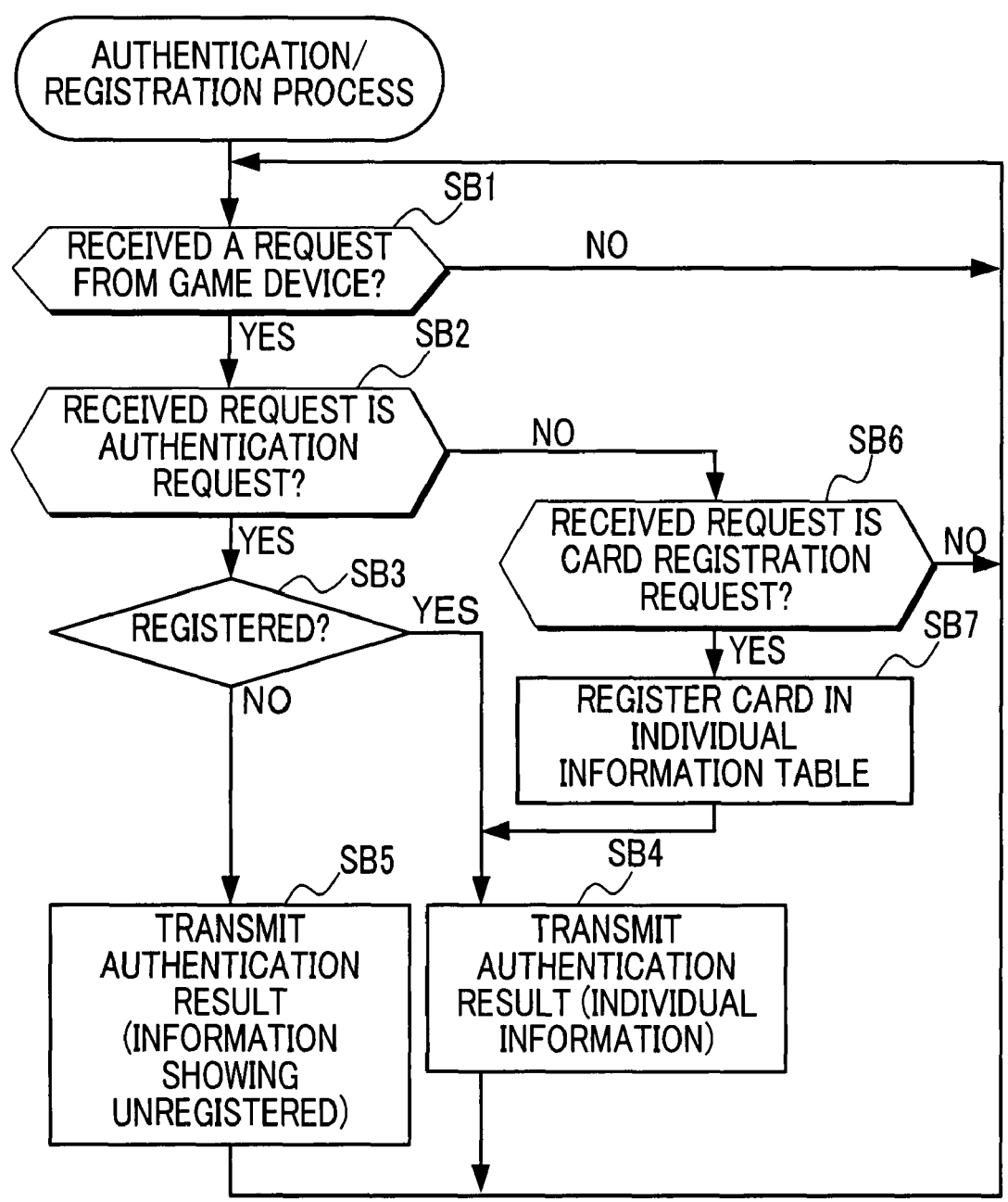
FIG. 14 is a flow chart showing an authentication and registration process performed by a game server device in the communication system of FIG. 1.

Operation of Each Game Device 1 for Obtaining Individual Information:

FIG. 12 is a diagram showing an operation of each game device 1 for obtaining individual information from game server device 3. This operation is actualized by processor 11 of each game device 1 performing a process of FIG. 13 and by processor 31 of game server device 3 performing a process of FIG. 14. FIG. 13 is a flow chart showing an authentication process, and FIG. 14 is a flow chart showing a process for one or both of authentication and registration.

In this operation, Player A first inserts one card 2 in the card acceptance slot of game device 1 and inserts a coin in the coin acceptance slot. At game device 1 (hereinafter referred to as "Player A's game device 1"), card reading device 13 then reads from card 2 a card ID which is to be supplied to processor 11. Processor 11, when it receives the supply of the card ID, transmits to game server device 3 an authentication request containing the supplied card ID (Step SA1 of FIG. 13).

In the meantime, processor 31 of game server device 3 repeats a determination as to whether it has received a request from a game device (Step SB1 of FIG. 14) until it receives such a request. Processor 31 receives a request from Player A's game device 1 in the repeat process. Upon receiving a request, a result of the determination of Step SB1 changes to "YES", and processor 11 determines whether the received request is an authentication request (Step SB2). Provided that the received request is an authentication request, processor 11 subsequently determines whether a card relating to the received authentication request is registered (Step SB3). Specifically, a card ID contained in the received authentication request is searched in individual information table T. It is determined that the card is registered in a case in which the number of hit records is 1 or more, whereas it is determined that the card is not registered in a case in which the number of hit records is 0.

In this case, it is assumed that a result of the determination changes to "YES". Processor 31 then reads individual information that is associated with the card ID from individual information table T, and replies to Player A's game device 1 with an authentication result containing the read individual information (Step SB4). "To reply" means to transmit information to a device having a communication address designated by the sender information contained in the received request. Subsequently, the process of game server device 3 returns to Step SB1.

Processor 11 of Player A's game device 1, after it transmits the authentication request, repeats a determination as to whether it has received an authentication result (Step SA2 of FIG. 13) until it receives the authentication result. Processor 11 receives an authentication result from game server device 3 during the repeat process. When the authentication result is received, a result of the determination of Step SA2 changes to "YES". Processor 11 then determines whether the received authentication result shows that the card is unregistered (Step SA3). Provided that information contained in the received authentication result is not information showing that the card is unregistered but is individual information (i.e., Player A's individual information including message information), the result of the determination changes to "NO". As a result, processor 11 writes the individual information contained in the received authentication result into personal information storage area 181 (Step SA7). The authentication process is thus completed.

Hereinafter, Player B's game device 1 and Player C's game device 1 each performs the above authentication process, to thereby obtain individual information. In a case in which it is assumed that card 2 used by Player C is unregistered, processor 31 of game server device 3, when it receives an authentication request from Player C's game device 1, determines that a card with respect to this authentication request is unregistered and replies to Player C's game device 1 with an authentication result containing information showing the card being unregistered (Steps SB1 to SB3, and SB5 of FIG. 14). The process at game server device 3 then returns to Step SB1.

On the other hand, processor 11 of Player C's game device 1, when it receives the authentication result from game server device 3 after transmitting the authentication request in Step SA1, determines that the received authentication result shows the card being unregistered and obtains information to be registered (Steps SA1 to SA4). The information to be registered is broadly divided into three units of information. The first unit of information is a card ID, the card ID having been supplied from card reading device 13. The second unit of information is a player ID, and the third is a card name. Although the second and the third units of information can be obtained in any manner, game device 1 causes display device 15 to display an image prompting a player to input information, and in accordance with what are displayed, input signals supplied from input device 14 are used to generate and obtain the second and the third units of information. Processor 11 then transmits a card registration request containing the obtained information to game server device 3 (Step SA5).

The card registration request is received by processor 31 of game server device 3. The result of the determination of Step SB1 of FIG. 14 then changes to "YES", and the result of the determination of Step SB2 changes to "NO" at game server device 3. Processor 31 then determines whether the received request is a card registration request (Step SB1, SB2, and SB6). Since a result of this determination changes to "YES", processor 31 registers the card with respect to the received card registration request (Step SB7). Specifically, the above three units of information contained in the received card registration request are stored in association with one another in individual information table T. In this case, from among individual information to be stored, information (e.g., message information M) other than the card name corresponds to an initial value that is predetermined.

Processor 31 then reads, from individual information table T, individual information that is associated with the card ID contained in the received card registration request to reply to Player C's game device 1 with an authentication result containing the read individual information (Step SB4). The routine at game server device 3 then returns to Step SB1. Processor 11 of Player C's game device 1 writes the individual information contained in the received authentication result into personal information storage area 181 (Step SA7). The authentication process is thus completed.

Operation Up to the Start of the Game with Multiple Players:

After the authentication process is completed, a screen is displayed on a display device of game device 1, the screen for prompting a player to select one of plural game modes. The plurality of game modes includes a mode with multiple players for enabling a game with multiple players.

Figure 15:
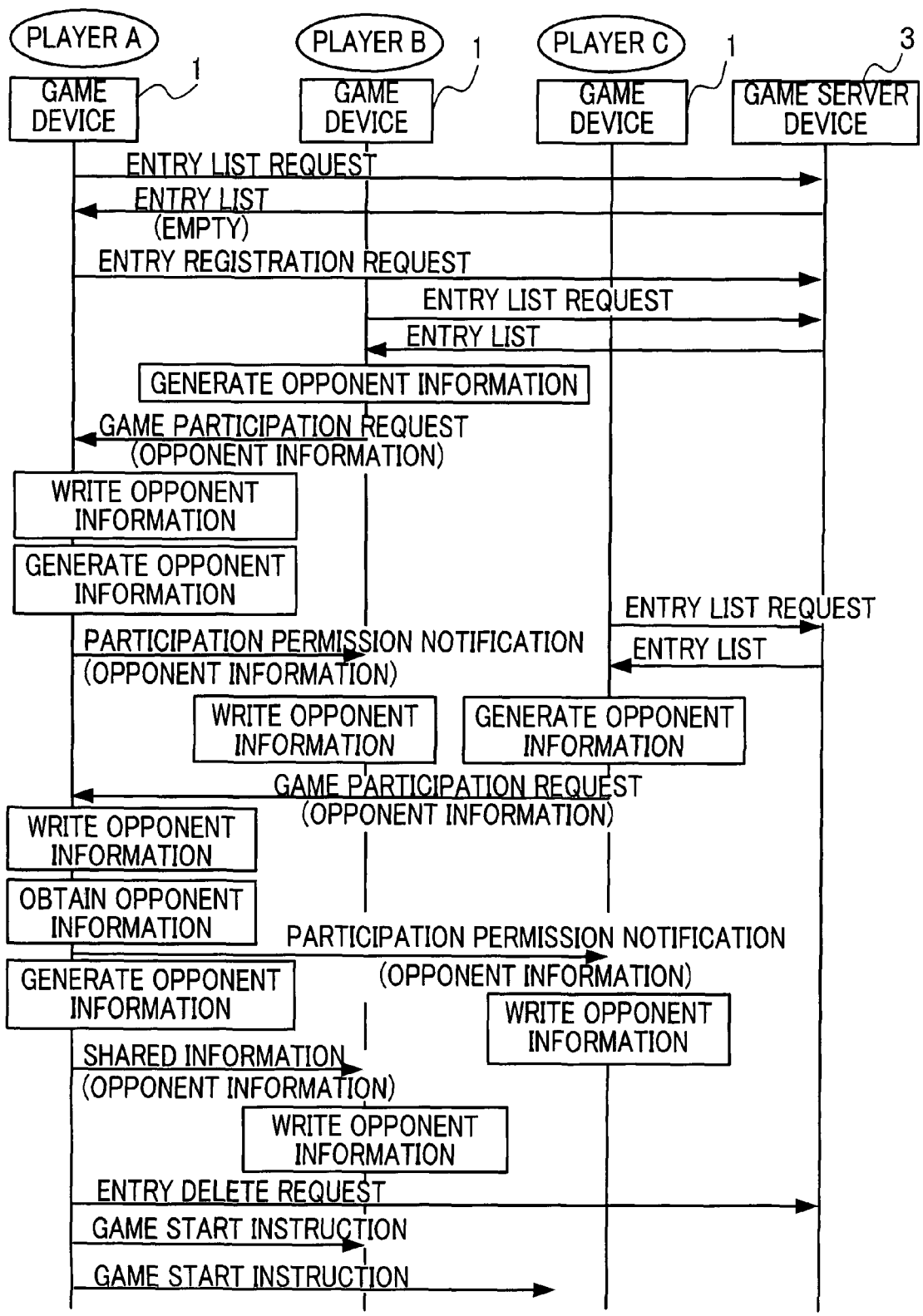
FIG. 15 is a diagram showing operations of game devices from a time each game device obtains individual information until a start of a game with multiple players in the communication system of FIG. 1.

FIG. 15 is a diagram showing an operation from the time each game device 1 obtains individual information until a game with multiple players is started in the communication system of FIG. 1. In this communication system, a game device performs a master-slave communication until the game is started. Specifically, one game device that first shows willingness to participate in a game acts as a master, and one or more other game devices that shows willingness to participate in the game at a subsequent time acts as a slave and only communicates with the master game device. This master-slave relationship is eventually dissolved, so that participating game devices have an equal relationship, i.e., each game device is then able to communicate with any other device. The game is then started.

First, when a mode for multiple players is selected at Player A's game device 1, processor 11 of this game device 1 transmits, to game server device 3, an entry list request requesting that an entry list be transmitted as a response. Processor 31 of game server device 3, when it receives the entry list request, reads from storage unit 33 an entry list L (FIG. 3) for transmission to game device 1 as a response. The entry list L is for storing a communication address of one or more master game devices 1 from which a game participation request is currently being accepted. Nothing has been written in the entry list L in an initial state (i.e., the list is empty.) Processor 11 of Player A's game device 1, after receiving the entry list L, determines whether this game device 1 should act as a master or as a slave. Since the entry list L is empty at this point in time, processor 11 recognizes that this game device 1 should act as a master, and transmits to game server device 3 an entry record request for registering a communication address of this game device 1 in the entry list L, to wait for a game participation request from another game device 1. That is, the first game device having transmitted an entry list request acts as a master from then on. Processor 31 of game server device 3, when it receives the entry registration request, registers the communication address contained in the entry registration request in the entry list L.

As shown in FIG. 15, while processor 11 of Player A's game device 1 is waiting for a game participation request, a mode for multiple players is selected at Player B's game device 1, whereby an entry list request and an entry list are transmitted and received between Player B's game device 1 and game server device 3. Processor 11 of this game device 1 recognizes that it should act as a slave, given that the communication address of Player A's game device 1 has been registered in the received entry list L. Processor 11 then generates opponent information containing individual information stored in personal information storage area 181 and a communication address of this game device 1, to transmit to Player A's game device 1 a game participation request containing the opponent information and requesting that this game device 1 be an opponent participant.

Processor 11 of Player A's game device 1, when it receives a game participation request from Player B's game device 1, recognizes Player B's game device 1 as an opponent participant. Processor 11 then writes the opponent information contained in the game participation request in opponent information storage area 182, generates opponent information containing individual information stored in personal information storage area 181 and a communication address of this game device 1, and replies to Player B's game device 1 with a participation permission notification containing the generated opponent information and permitting Player B's game device 1 to become an opponent participant. Processor 11 then waits for another game participation request. Processor 11 of Player B's game device 1, when it receives the participation permission notification, writes the opponent information contained in the participation permission notification into opponent information storage area 182 and waits for shared information (described below) or a game start instruction (described below).

As shown in FIG. 15, while processor 11 of Player A's game device 1 and Player B's game device 1 are performing the above process, a multi-player mode is selected at Player C's game device 1, whereby an entry list request and an entry list are transmitted and received between Player C's game device 1 and game server device 3. Processor 11 of this game device 1 recognizes that it should act as a slave, given that the communication address of Player A's game device 1 has been registered in the received entry list L. Processor 11 then generates opponent information containing individual information stored in personal information storage area 181 and a communication address of this game device 1, to transmit to Player A's game device 1 a game participation request containing the opponent information and requesting that this game device 1 be an opponent participant.

Processor 11 of Player A's game device 1, upon receiving the game participation request from Player C's game device 1, recognizes Player C's game device 1 as an opponent participant and writes the opponent information contained in this game participation request into opponent information storage area 182. Processor 11 generates opponent information containing individual information stored in personal information storage area 181 and a communication address of this game device 1 itself and reads the opponent information from opponent information storage area 182. Processor 11 replies to Player C's game device 1 with a participation permission notification containing the generated opponent information and the read opponent information and permitting Player C's game device 1 to become an opponent participant. Processor 11 of Player C's game device 1, upon receiving the participation permission notification, writes the opponent information contained in the participation permission notification to opponent information storage area 182, and waits for a game start instruction described below.

Subsequently, processor 11 of Player A's game device 1 reads from opponent information storage area 182 opponent information (opponent information of Player C's game device 1) that has not been provided to a game device 1 (Player B's game device 1) which only has opponent information on the master's game device 1, to transmit shared information containing the opponent information to the game device 1 which only has opponent information on the master game device 1. When the shared information is received, processor 11 of Player B's game device 1 writes the opponent information contained in the shared information into opponent information storage area 182, and waits for the game start instruction described below.

Processor 11 of Player A's game device 1, since the number of participants including this game device 1 reaches the maximum number of three, transmits to game server device 3 an entry deletion request requesting that the communication address of this game device 1 be deleted from the entry list L. Processor 31 of game server device 3, when it receives this entry deletion request, deletes from the entry list L the communication address of the sender of this entry deletion request. As a result, the entry list L becomes empty.

Processor 11 of Player A's game device 1 then transmits a game start instruction to other participant game devices (i.e., Player B's game device 1 and Player C's game device 1), the game start instruction instructing that a game be started. In Player A's game device 1, the transmission of the game start instruction is a condition for starting a game with multiple players, whereas in Player B and C's game devices 1, the receipt of the game start instruction is a condition for starting the game.

Although in the above operation the transmission of a game start instruction is triggered by the number of the participants reaching the maximum number, it may be such that even if the number of participants does not reach the maximum number, a game start instruction is transmitted when a predetermined timer has run out.

Figure 16:
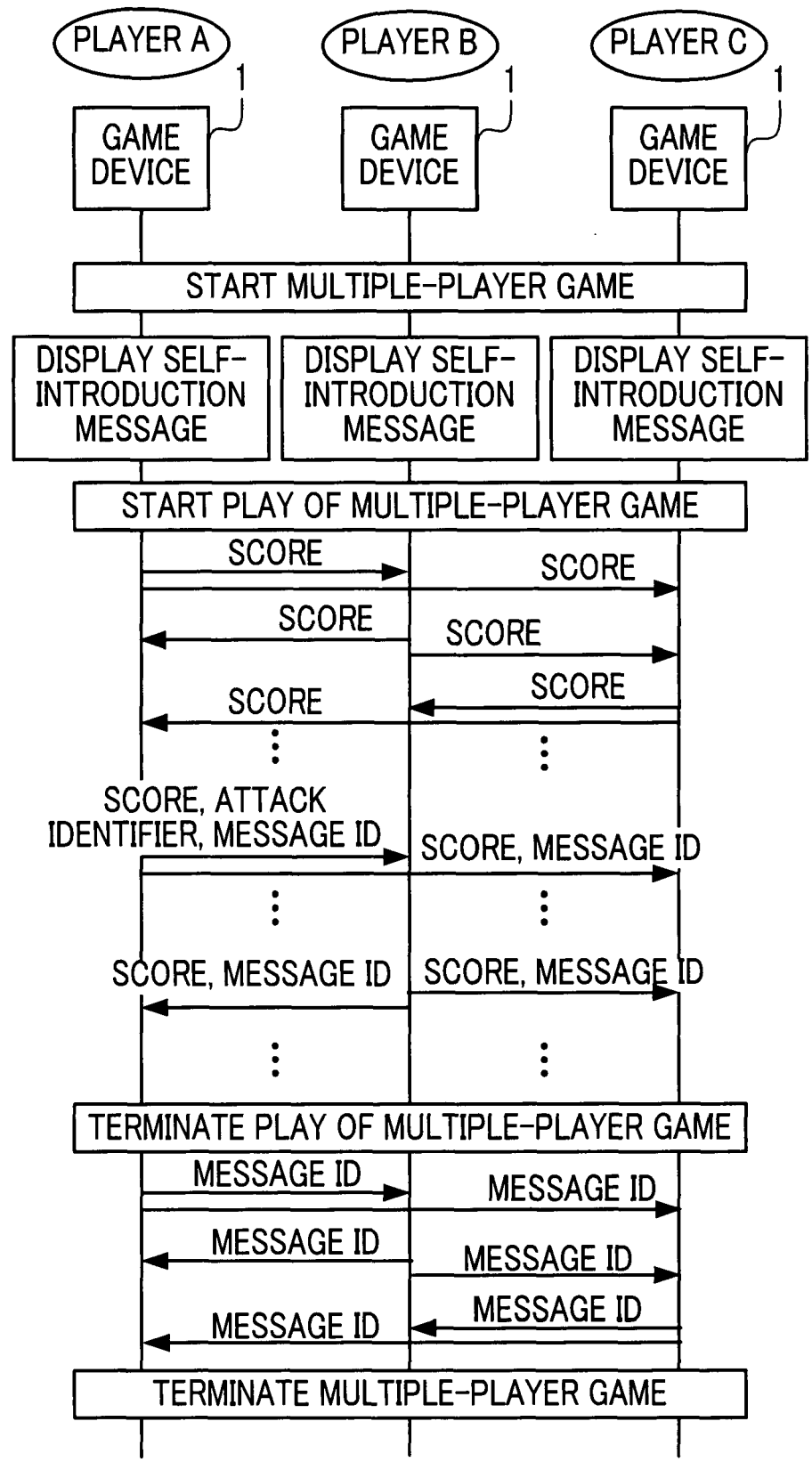
FIG. 16 is a diagram showing operations of game devices from the start to the end of a game with multiple players in the communication system of FIG. 1.

Operation from Start to End of Game with Multiple Players:

FIG. 16 is a diagram showing operations of game devices from the start to the end of a game with multiple players in the communication system of FIG. 1.

Figure 17:
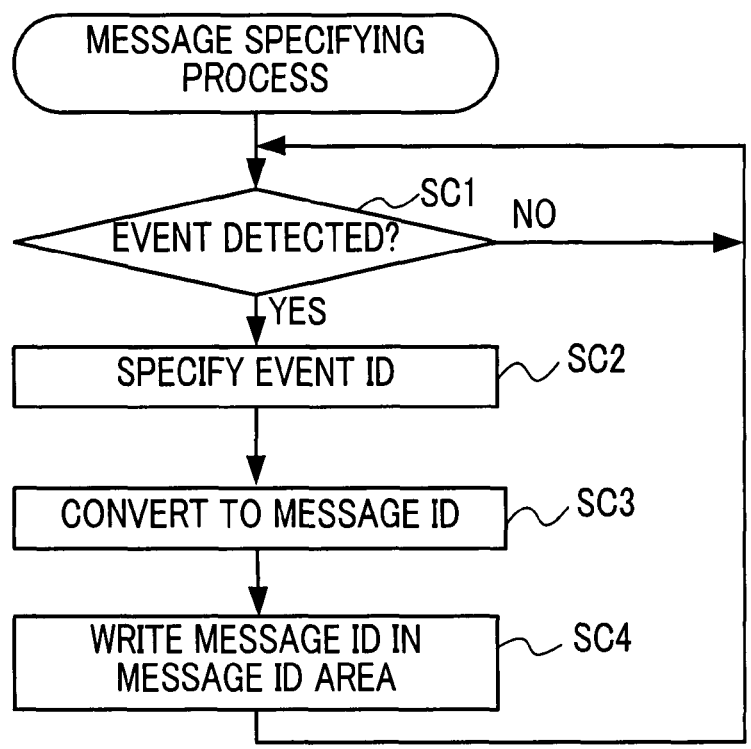
FIG. 17 is a flow chart showing a message specifying process performed at a game device.
Figure 18:
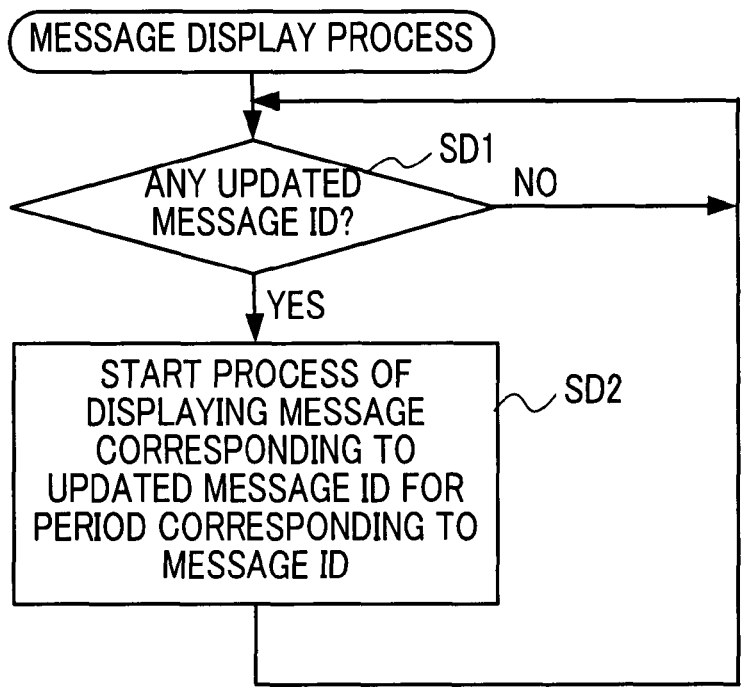
FIG. 18 is a flow chart showing a message displaying process performed at a game device.
Figure 19:
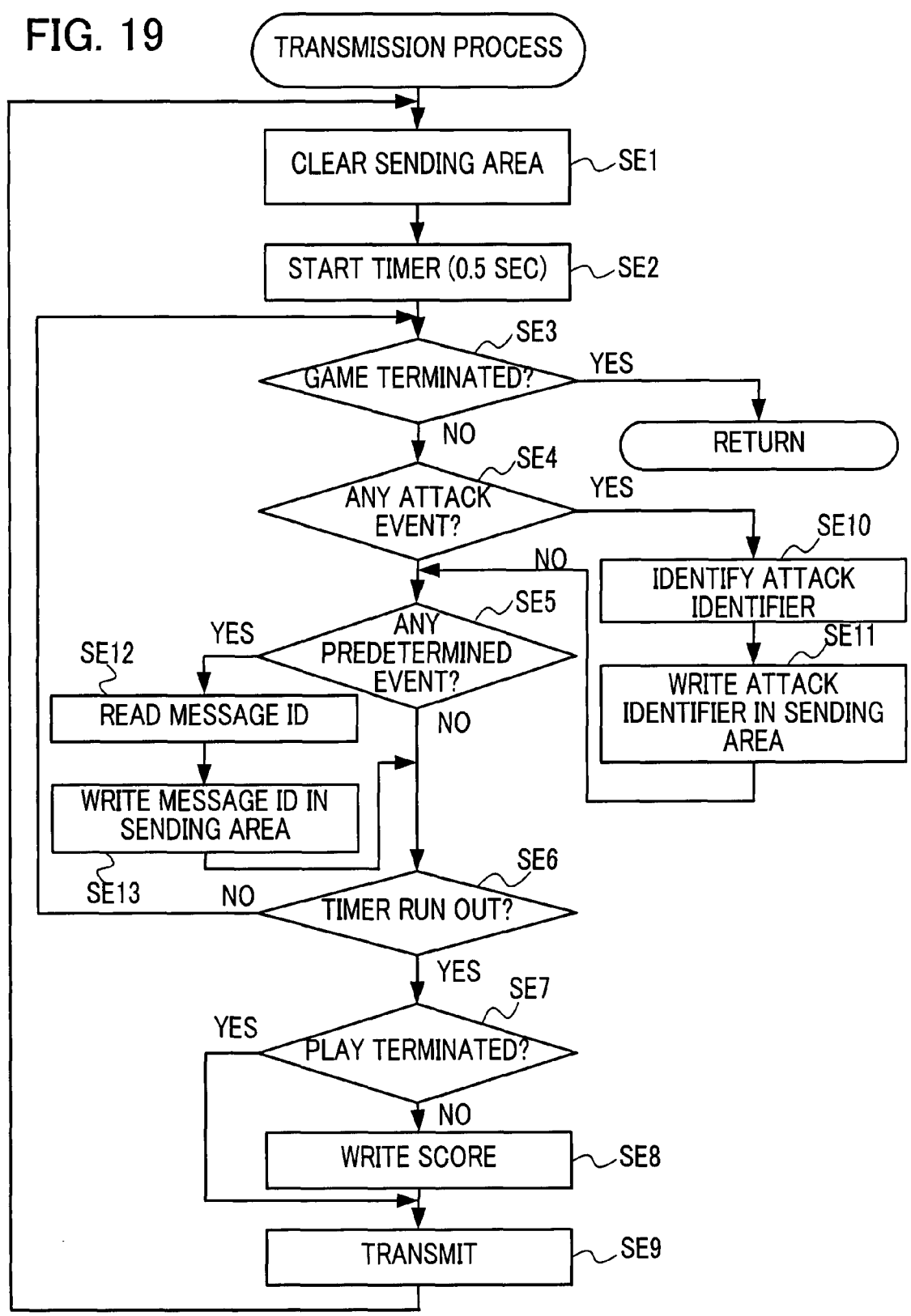
FIG. 19 is a flow chart showing a transmission process performed at a game device.
Figure 20:
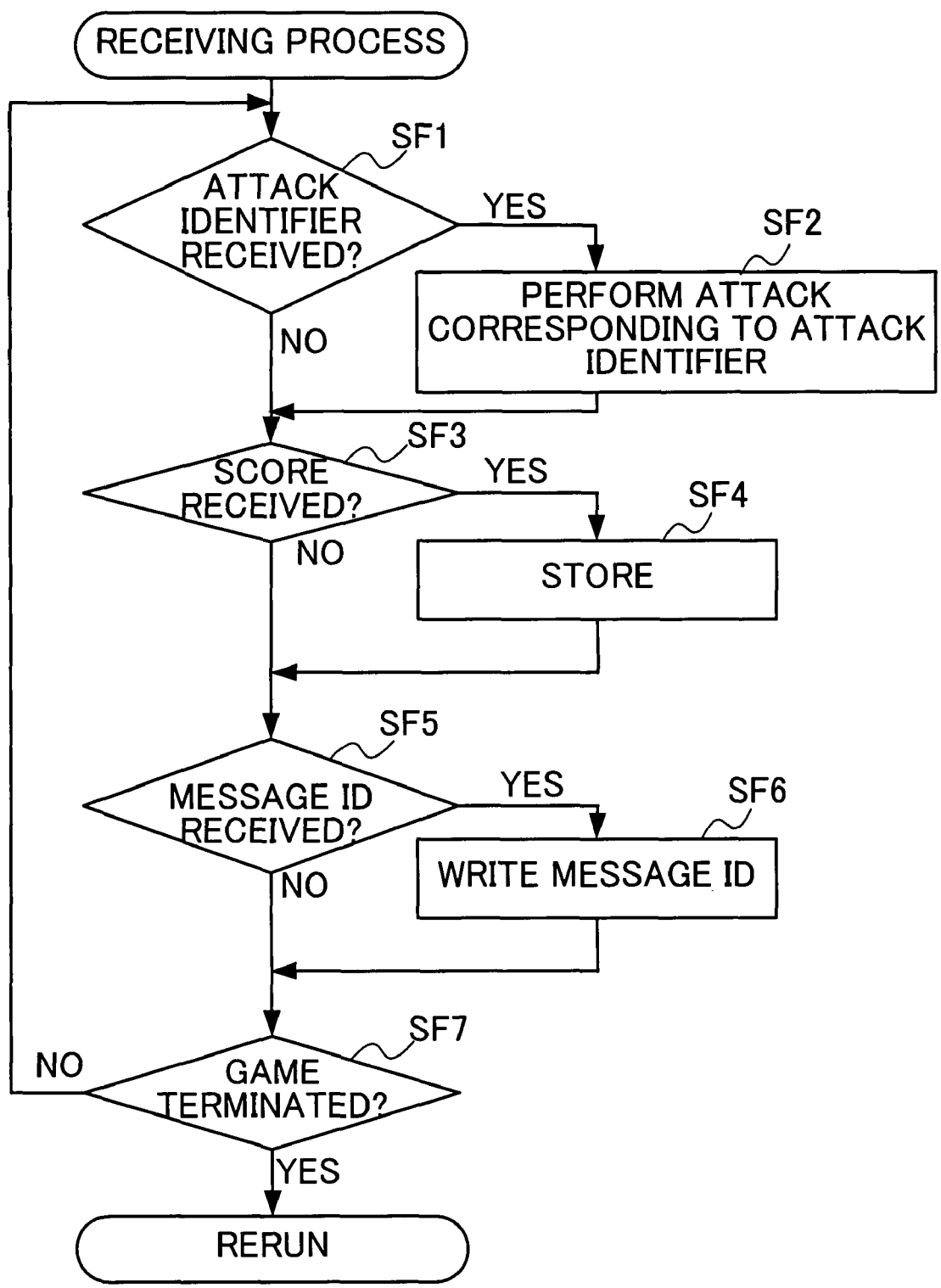
FIG. 20 is a flow chart showing a receiving process performed at a game device.

This operation is actualized when processors 11 of game devices of Players A to C perform processes shown in FIGS. 17 to 20 in parallel. FIG. 17 is a flow chart showing a message specifying process. FIG. 18 is a flow chart showing a message display process. FIG. 19 is a flow chart showing a transmission process. FIG. 20 is a flow chart showing a receiving process. In this operation, there is no master-slave relationship among game devices 1. That is, processor 11 of each game device 1 functions as a shifter that dissolves the master-slave relationship when a game start instruction is transmitted (master) or when a game start instruction is received (slave)

and that shifts a communication mode with other game devices to an individual control mode.

In the message specifying process of FIG. 17, each processor 11 of Players A to C's game devices 1 (hereinafter referred to simply as "each processor 11") determines whether a predetermined event has been detected (Step SC1). In a case in which a result of this determination changes to "NO", the routine returns to Step SC1. There are seven types of predetermined events as described above. Criteria for detection will be described in the following for each type of event. The event in which a game with multiple players was started is detected in a case in which a game start instruction is transmitted or received. The event in which a player of this game device 1 is playing well is detected in a case in which, for example, appropriate operations are performed at appropriate timings 5 consecutive times. The event in which the player is playing poorly is detected in a case in which, for example, inappropriate operations are performed at inappropriate timings 3 consecutive times. The event in which the player of this game device 1 made an attack is detected in a case in which, when a particular object overlaps a line, an operation corresponding to this object is performed. The event in which the player was attacked and damaged is detected in a case in which, for example, an operation is performed at an inappropriate timing or an inappropriate operation is performed before a predetermined attack period (e.g. 10 seconds) elapses since the attacked time. The event in which the player has won the game is detected in a case in which there is no other player who has gained a score that is higher than that of the player at the end of the play. The event in which the player lost the game is detected in a case in which another player has gained a score that is higher than that of the player at the end of the play.

During a stage in which a play has not been started, the event in which a game with multiple players has been started is the only event that is detected. When this event is detected, the determination of Step SC1 changes to "YES". Each processor 11 then specifies an event ID of the detected event (Step SC2) and refers to conversion table 184 to convert the event ID to a message ID (Step SC3). Each processor 11 then overwrites what is written in message ID area 185 with the detected message ID in association with every participant including its own game device 1 (Step SC4). The routine then returns to Step SC1.

On the other hand, each processor 11, in the message display process of FIG. 18, determines whether there is an updated message ID in message ID area 185 (Step SD1). Because a message ID in message ID area 185 is overwritten only when a predetermined event is detected, a result of the determination changes to "NO" if no predetermined event is detected, and the routine returns to Step SD1.

On the other hand, in a case in which the event in which a game with multiple players has been started is detected, a determination result of Step SD1 changes to "YES". Each processor 11 then reads a message data unit corresponding to the updated message ID and starts a process of displaying a message represented by the message data for a period that is predetermined depending on a message ID (Step SD2). At this point in time, each processor 11 is displaying a game start screen on display device 15. Also at this point in time, message IDs have been updated for all the participants, and the message IDs correspond to self-introduction messages. Therefore, a game start screen as shown in FIG. 7 is displayed at each game device 1 of Players A to C. As a result, each of Players A to C is able to view self-introduction messages of all the participants including the player's own message. The routine then returns to Step SD1.

In a case in which a predetermined period elapses from the time the displaying of self-introduction messages is started, each processor 11 causes a game screen to be displayed on display device 15, to enable the player to play a game with multiple players. In the meantime, each processor 11 performs the transmission process of FIG. 19 and the receiving process of FIG. 20.

In the transmission process, each processor 11 clears what is stored in a sending area (not shown) reserved for each of the other participants in storage unit 18 (Step SE1), and processor 11 starts a timer that runs out in 0.5 seconds (Step SE2). Each processor 11 then performs a determination as to whether a game with multiple players has ended (Step SE3), a determination as to whether an attack event has been detected (Step SE4), a determination as to whether a predetermined event has been detected (Step SE5), and a determination as to whether a timer has run out (Step SE6) repeatedly in the listed order until the timer runs out.

In an operational example of FIG. 16, the timer first runs out, and the determination of Step SE6 changes to "YES". Each processor 11 then determines whether the play of the game with multiple players has ended (Step SE7). A result of the determination changes to "NO" in this case. As a result, each processor 11 reads a score from a predetermined area of storage unit 18 to write the score into the above two sending areas (Step SE8). The information within each of the sending areas is then transmitted to a corresponding one of the other participant game devices 1 (Step SE9). The routine then returns to Step SE1.

Hereinafter, the same process as above is repeated. At a certain point in time, processor 11 of Player A's game device 1 detects an attack event. As a result, the above message specifying process and the above message display process are performed, so that a message displayed on game devices of Players A to C will change to what is shown in the top row of FIG. 21. That is, Player A's message is displayed only on Player A's game device 1.

Figure 21:
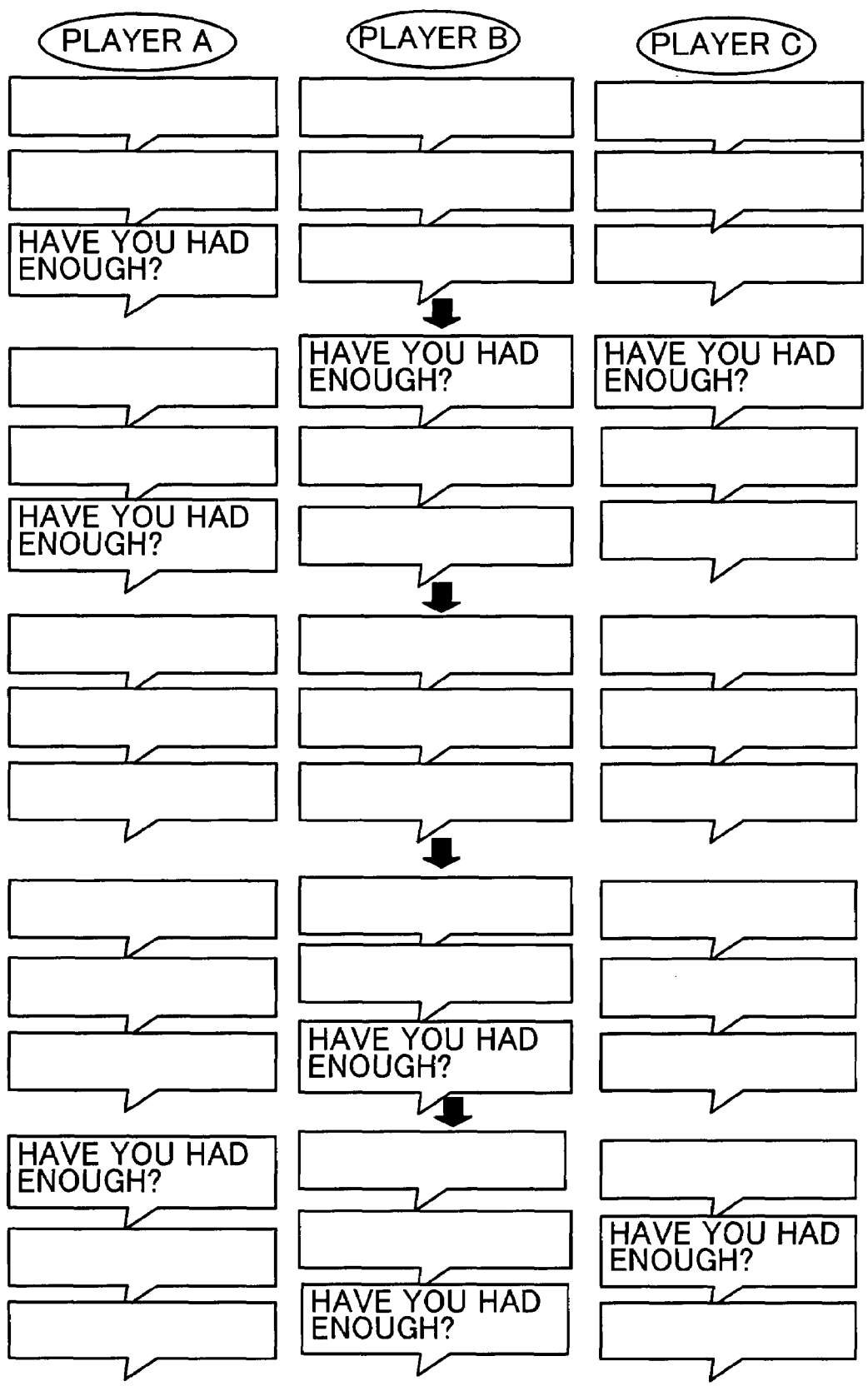
FIG. 21 is a state transition diagram showing changes in message groups displayed at plural game devices during a play.

FIG. 21 is a state transition diagram showing changes in message groups displayed at plural game devices during a play. In this figure, states of message groups change from an upper row to a lower row. In each message group, three messages in the left column are to be displayed at Player A's game device 1, three messages in the right column are to be displayed at Player C's game device 1, and three messages in the center column are to be displayed at Player B's game device 1.

In a case in which processor 11 of Player A's game device 1 detects an attack event, a result of the determination of Step SE4 changes to "YES" in the transmission process of FIG. 19. Processor 11 then determines an attack identifier and an attack object in accordance with game situations (Step SE10). An attack identifier and an attack object can be determined in any way and can be determined, for example, at random. In FIG. 16, Player B's game device 1 is determined as an attack object, and processor 11 of Player A's game device 1 writes a determined attack identifier to a sending area corresponding to an attack object (Step SE11). The routine then proceeds to Step SE5.

Since an attack event is a predetermined event, a result of the determination of Step SE5 changes to "YES". Processor 11 then reads a message ID from an own message ID area for processor 11 itself (Step SE12) to write the read message ID to sending areas of the other participants (Step SE13). The routine then proceeds to Step SE6.

In a case in which a timer runs out at a subsequent time, processor 11 writes a score to the sending areas for the other participants and transmits the information in each sending area to a destination (Steps SE6 to SE9). As a result, a score, an attack identifier, and a message ID are transmitted to Player B's game device 1, and a score and a message ID are transmitted to Player C's game device 1.

In the meantime, in the receiving process, each processor 11 repeats the following processes (α) to (δ) sequentially until the game with multiple players ends.

(α) Processor 11 determines whether it has received an attack identifier (Step SF1), and; only in a case in which it is determined that an attack identifier has been received, processor 11 performs an attack of a type which is designated by the received attack identifier (Step SF2). Specifically, processor 11 controls its game device 1 so that the play of a player using the game device 1 is disturbed. More specifically, at least one of the width of a game screen that is being displayed is narrowed, the displayed screen is darkened or swung, the volume of music sounds output from speaker 16 is decreased, and an output timing of output music sounds is delayed, so as to thereby increase the degree of difficulty.

(β) Processor 11 determines whether it has received a score (Step SF3), and only in a case in which it is determined that a score has been received, the received score is written in a score area (not shown) reserved for each of the other participants for storage therein (Step SF4). A score thus stored is displayed in a corresponding area.

(γ) Processor 11 determines whether it has received a message ID (Step SF5), and, only in a case in which it is determined that a message ID has been received, processor 11 overwrites the received message ID in association with a sender game device 1 with what is written in message ID area 185 (Step SF6).

(δ) Processor 11 determines whether the game with multiple players has ended (Step SF7).

In a case in which processor 11 of Player B's game device 1 receives a score, an attack identifier, and a message ID from Player A's game device 1, determination results of Steps SF1, SF3, and SF5 all change to "YES". Therefore, processor 11 performs an attack of a type indicated by the attack identifier, overwrites the score with what is written in a score area corresponding to Player A, and overwrites the message ID in association with Player A's game device with what is written in message ID area 185. In the meantime, the same process as above is performed at Player C's game device 1, except that an attack is not performed since the determination result of Step SF1 changes to "NO". After these processes and the message display process are performed, the message groups displayed on game devices 1 of Players A to C will change to those which are shown in the second row from the top of FIG. 21. That is, in each of Players A to C's game devices, a message of Player A is displayed in a position corresponding to Player A. When a period predetermined in accordance with the above message ID elapses, message groups displayed on Players A to C's game devices 1 will be those which are shown in the third row from the top of FIG. 21. That is, the display of the message is ended.

In FIG. 16, at a subsequent time, an event in which the player has been attacked and damaged is detected at Player B's game device 1. The operation performed in this case is the same as the above except that no attack identifier is transmitted. In this case, since it is Player B's game device 1 that has detected this event, message groups displayed on Players A to C's game devices will first be those which are shown in the fourth row from the top and then be those which are shown in the fifth row from the top of FIG. 21. An operation of a case in which an event in which a player of this game device 1 is playing well is detected and an operation of a case in which the player is playing poorly is detected is obvious from the above description, and therefore, the description thereof will be omitted.

As shown in FIG. 16, when the music ends and the play of the game with multiple players ends, an event in which the player has won the game or an event in which the player has lost the game is detected in each game device 1 of Players A to C. The operation in this case will be the same as the above except that, since the play has already ended, a result of the determination of Step SE7 changes to "YES", and only a message ID will be transmitted. Thus, messages of Players A to C, each message corresponding to one of the above two events, are displayed at Players A to C's game devices 1.

The invention claimed is:

1. A game system, comprising:
    a game server device comprising:
        a storage unit that stores message information representing contents of a message sent by each of a plurality of players in association with identification information identifying each of the plurality of players; and
        a deliverer that, upon receiving a message request containing identification information and requesting that message information associated with the identification information be transmitted as a response, reads from the storage unit the message information, which can be its own information, that is associated with the identification information contained in the message request and that transmits a message response containing the message information, the message response being the response to the message request; and
    at least two game devices, which, through communication directly with one another and not via the game server, enable the plurality of players to play a game with multiple players as participants of the game with multiple players, said at least two game devices being associated with each other, each of said game devices comprising:
        a personal information storage unit that stores information written for a player of each said game device among the plurality of players;
        an opponent information storage unit that stores information that has been written with respect to an opponent participant;
        a reader that reads the identification information from an information recording medium in which the identification information is recorded;
        a delivery requester that transmits, to said game server device, the message request containing the identification information read by said reader;
        a personal information writer that, upon receiving the message response, writes, in said personal information storage unit, the message information contained in the message response;
        a presharing unit that transmits the message information stored in said personal information storage unit directly to the opponent participant and not via the game server;
        an opponent information writer that, upon receiving directly from the opponent participant and not via the game server, message information of the opponent participant, writes the message information of the opponent participant into said opponent information storage unit;
        a detector that detects a predetermined event;
        an event processor that, in a case in which the event is detected by said detector, performs a process of displaying a message having contents represented by the message information stored in said personal information storage unit and performs a process of transmitting to the opponent participant a display request requesting that the message be displayed; and a display request processor that, upon receiving from the opponent participant a display request of the opponent participant, displays a message having contents represented by the message information of the opponent participant stored in the opponent information storage unit.

2. A game server device for use in a game system having a plurality of game devices, the game server device comprising:

a communicator that communicates with said plurality of game devices that are adapted to communicate with one another directly and not via the game server as participants of a game with multiple players, said plurality of game devices being associated with one another and enabling players to play a game with multiple players;

a storage unit that stores message information representing contents of a message sent by each of the players and identification information for identifying each of the players in association with each other; and a deliverer that, upon receiving a message request from a game device among said plurality of game devices, the message request containing identification information and requesting that message information be transmitted as a response, reads from the storage unit the message information that is associated with the identification information contained in the message request, which can be its own information, and that transmits a message response containing the message information, the message response being the response to the message request, to said game device, wherein said game device:

reads the identification information from an information recording medium and transmits the message request, upon receiving the message response from said game server device, writes the message information contained in the message response for storage in a personal information storage unit, transmits directly and not via the game server the message information stored in the personal information storage unit to an opponent participant, writes, upon receiving message information of the opponent participant directly and not via the game server from the opponent participant, the message information of the opponent participant for storage into an opponent information storage unit, displays, upon detecting a predetermined event, a message having contents represented by the message information stored in the personal information storage unit while transmitting to the opponent participant a display request requesting that the message be displayed, and displays, upon receiving from the opponent participant, a display request of the opponent participant, a message having contents represented by message information of the opponent participant stored in the opponent information storage unit.

3. A game system comprising:

a game server device, a plurality of game devices and a plurality of terminal devices, wherein the game server device comprises:

(a) a storage unit that stores message information of a player and identification information unique to the player in association with each other;

(b) a first transmitter that transmits, upon receiving a message request from one of said plurality of game devices, message information to the one said plurality of game devices which, through communication with one another, enable players to play a game with multiple players as participants of the game with multiple players, game devices used by the players in playing the game among said plurality of game devices being associated with one another as the participants of the game and the message information representing contents of a message of each of the players;

(c) a second transmitter that, upon receiving identification information from one of said terminal devices, transmits message information to the one of said terminal devices after reading from the storage unit message information corresponding to identification information specified by the one of said terminal devices that is operated by one of the players, and (d) an updater that, upon receiving the update information transmitted from the one of said terminal devices, updates the message information stored in the storage unit with the update information; and wherein each of said plurality of game devices has:

a personal information storage unit that stores information written for a player of the each game device among the plurality of game devices;

an opponent information storage unit that stores information that has been written with respect to an opponent participant;

a reader that reads identification information from an information recording medium in which the identification information is recorded;

a delivery requester that transmits, to the game server device, the message request containing the identification information read by said reader;

a personal information writer that, upon receiving the message response, writes, in the personal information storage unit, the message information contained in the message response;

an opponent information writer that, upon receiving from the opponent participant, message information of the opponent participant, writes the message information of the opponent participant into said opponent information storage unit;

a detector that detects a predetermined event;

an event processor that, in a case in which the event is detected by said detector, performs a process of displaying a message having contents represented by the message information stored in said personal information storage unit and performs a process of transmitting to the opponent participant display request requesting that the message be displayed; and, a display request processor that, upon receiving from the opponent participant a display request of the opponent participant, displays a message having contents represented by the message information of the opponent participant stored in said opponent information storage unit; and wherein each of said terminal devices has an input device operated by each of the players who uses each of said terminal devices, a display device, and a processor for causing an edit screen for editing the message information transmitted by the second transmitter of the game server device, and wherein the processor transmits the identification information unique to the one of the players to the game server device, receives the message information of the one of the players from the game server device, and displays the edit screen of the message information, thereby prompting the one of the players to edit the message information by operating the input device, and replies to the game server device with an edit result as update information.

4. A game device for use in a game system having a game server device, the game device comprising:

a first communicator that communicates with other game devices, so that players are enabled to play a game with multiple players as participants of the game for multiple players, the game devices being associated with one another and operative to communicate directly and not via the game server;

a second communicator that communicates with said game server device that stores message information, which can be a game devices own information, representing contents of a message sent by each of the players and identification information that identifies each of the players, with the message information and the identification information being stored in association with each other, and transmits, upon receiving a message request containing the identification information, with the message request requesting that the message information corresponding to the identification information be transmitted as a response, a message response containing the message information corresponding to the identification information contained in the message request, the message response being the response to the message request;

a personal information storage unit that stores information that has been written with respect to a player of said game device;

an opponent information storage area that stores information that has been written with respect to an opponent participant;

a reader that reads the identification information from an information recording medium in which the identification information is recorded;

a delivery requester that transmits the message request containing the identification information read by the reader to the game server device;

a personal information writer that, upon receiving the message response, writes in the personal information storage unit the message information in the message response;

a presharing unit that transmits the message information stored in the personal information storage unit directly and not via the game server to the opponent participant;

an opponent information writer that, upon receiving from the opponent participant directly and not via the game server message information of the opponent participant, writes the message information of the opponent participant into the opponent information storage unit;

a detector that detects a predetermined event;

an event processor that, in a case in which the event is detected by the detector, performs a process of displaying a message having contents represented by the message information stored in the personal information storage unit and a process of transmitting to an opponent participant a display request requesting that the message be displayed; and a display request processor that, upon receiving from an opponent participant the display request, displays a message having contents represented by the message information stored in the opponent information storage unit.

5. A game device according to claim 4, wherein there is a plurality of predetermined events, wherein the message information contains, for each of a plurality of the players, a pair of identifiers identifying each of the events and a message data unit representing contents of a message;

wherein said event processor, in a case in which one of the events is detected by the detector, performs a process of displaying a message having contents represented by the message data unit that is in a pair with the identifier corresponding to the detected event and performs a process of transmitting to the opponent participant a display request containing the identifier and requesting that the message be displayed; and wherein said display request processor, upon receiving from the opponent participant a display request of the opponent participant, displays a message having contents represented by a message data unit of the opponent participant that is stored in association with the opponent participant in the opponent information storage unit and is in a pair with the identifier contained in the display request.

6. A game device according to claim 4, further comprising an inputter that is operated by a player and that receives an instruction input of the player, wherein the predetermined event is a receipt of a predetermined instruction at the inputter.

7. A game device according to claim 4, wherein said presharing unit transmits, to an opponent participant, message information stored in the personal information storage unit and a communication address of the game device;

wherein said opponent information writer receives, from the opponent participant, message information and a communication address of the opponent participant and writes the message information and the communication address in the opponent information storage unit; and wherein said display request processor, upon receiving from the opponent participant a display request of the opponent participant, displays a message having contents represented by the message information stored, in the opponent information storage unit, in association with a communication address of a sender of the display request.

8. A method of controlling a game system having a game server device and a plurality of game devices which, through communication with one another, enable players to play a game with multiple players as participants of the game for multiple players, the plurality of game devices being associated with one another, said method comprising:

storing, at said game server device, message information representing contents of a message sent by each of the players and identification information identifying each player in association with each other;

reading, at a game device among said plurality of game devices, the identification information from an information recording medium carried by the player and transmitting from the game device a message request containing the identification information and requesting that the message information corresponding to the identification information be transmitted as a response;

receiving at said game server device the message request and transmitting a message response containing the message information corresponding to the identification information contained in the message request, the message response being the response to the message request;

performing at said game device a process of receiving the message response and writing in a personal information storage unit the message information, which can be its own information, contained in the message response for storage and performing a process of transmitting the message information stored in the personal information storage unit to an opponent participant, while performing a process of receiving, from the opponent participant, message information of the opponent participant and writing the message information of the opponent participant in an opponent information storage unit for storage; and performing at said game device a process of detecting a predetermined event and displaying a message having contents represented by the message information stored in the personal information storage unit and performing a process of transmitting to an opponent participant directly and not via the game server a display request requesting that the message be displayed, while performing a process of, upon receiving from the opponent participant a display request of the opponent participant directly and not via the game server, displaying a message having contents represented by the message information of the opponent participant stored in the opponent information storage unit.

9. A method of controlling a game system according to claim 8, wherein, before a play of a game with the opponent participant is started, when the game device writes the message information contained in the message response into the personal information storage unit and when the game device writes in the opponent information storage unit the message information of the opponent participant in association with a communication address of the opponent participant; and wherein the detector detects the event during a play of the game with the opponent participant.

10. A game device according to claim 5, further comprising an inputter that is operated by a player and that receives an instruction input of the player, wherein the predetermined event is a receipt of a predetermined instruction at the inputter.

11. A game system, comprising:

a game server device comprising:

a storage unit that stores message information representing contents of a message sent by each of a plurality of players in association with identification information identifying each of the plurality of players; and a deliverer that, upon receiving a message request containing identification information and requesting that message information associated with the identification information be transmitted as a response, reads from the storage unit the message information that is associated with the identification information contained in the message request and that transmits a message response containing the message information, the message response being the response to the message request; and at least two game devices, which, through communication with one another, enable the plurality of players to play a game with multiple players as participants of the game with multiple players, said at least two game devices being associated with each other, each of said game devices comprising:

a personal information storage unit that stores information written for a player of each said game device among the plurality of players;

an opponent information storage unit that stores information that has been written with respect to an opponent participant;

a reader that reads the identification information from an information recording medium in which the identification information is recorded;

a delivery requester that transmits, to said game server device, the message request containing the identification information read by said reader;

a personal information writer that, upon receiving the message response, writes, in said personal information storage unit, the message information contained in the message response;

a presharing unit that transmits the message information stored in said personal information storage unit to the opponent participant;

an opponent information writer that, upon receiving from the opponent participant, message information of the opponent participant, writes the message information of the opponent participant into said opponent information storage unit;

a detector that detects a predetermined event;

an event processor that, in a case in which the event is detected by said detector, performs a process of displaying a message having contents represented by the message information stored in said personal information storage unit and performs a process of transmitting to the opponent participant a display request requesting that the message be displayed; and a display request processor that, upon receiving from the opponent participant a display request of the opponent participant, displays a message having contents represented by the message information of the opponent participant stored in the opponent information storage unit, wherein the message information of the opponent participant is stored in said opponent information storage unit prior to said detector detecting the predetermined event.

12. A game server device for use in a game system having a plurality of game devices, the game server device comprising:

a communicator that communicates with said plurality of game devices that communicate with one another as participants of a game with multiple players, said plurality of game devices being associated with one another and enabling players to play a game with multiple players;

a storage unit that stores message information representing contents of a message sent by each of the players and identification information for identifying each of the players in association with each other; and a deliverer that, upon receiving a message request from a game device among said plurality of game devices, the message request containing identification information and requesting that message information be transmitted as a response, reads from the storage unit the message information that is associated with the identification information contained in the message request and that transmits a message response containing the message information, the message response being the response to the message request, to said game device, wherein said game device:

reads the identification information from an information recording medium and transmits the message request, upon receiving the message response from said game server device, writes the message information contained in the message response for storage in a personal information storage unit, transmits the message information stored in the personal information storage unit to an opponent participant, writes, upon receiving message information of the opponent participant from the opponent participant, the message information of the opponent participant for storage into an opponent information storage unit, displays, upon detecting a predetermined event, a message having contents represented by the message information stored in the personal information storage unit while transmitting to the opponent participant a display request requesting that the message be displayed, and displays, upon receiving from the opponent participant, a display request of the opponent participant, a message having contents represented by message information of the opponent participant stored in the opponent information storage unit, wherein the message information of the opponent participant is stored in said opponent information storage unit prior to said predetermined event being detected.

13. The game server device of claim 3, wherein the message information representing the contents of the message of each of the players is stored in each of said plurality of game devices prior to said predetermined event taking place.

14. A game device for use in a game system having a game server device, the game device comprising:

a first communicator that communicates with other game devices, so that players are enabled to play a game with multiple players as participants of the game for multiple players, the game devices being associated with one another;

a second communicator that communicates with said game server device that stores message information representing contents of a message sent by each of the players and identification information that identifies each of the players, with the message information and the identification information being stored in association with each other, and transmits, upon receiving a message request containing the identification information, with the message request requesting that the message information corresponding to the identification information be transmitted as a response, a message response containing the message information corresponding to the identification information contained in the message request, the message response being the response to the message request;

a personal information storage unit that stores information that has been written with respect to a player of said game device;

an opponent information storage area that stores information that has been written with respect to an opponent participant;

a reader that reads the identification information from an information recording medium in which the identification information is recorded;

a delivery requester that transmits the message request containing the identification information read by the reader to the game server device;

a personal information writer that, upon receiving the message response, writes in the personal information storage unit the message information in the message response;

a presharing unit that transmits the message information stored in the personal information storage unit to the opponent participant;

an opponent information writer that, upon receiving from the opponent participant message information of the opponent participant, writes the message information of the opponent participant into the opponent information storage unit;

a detector that detects a predetermined event;

an event processor that, in a case in which the event is detected by the detector, performs a process of displaying a message having contents represented by the message information stored in the personal information storage unit and a process of transmitting to an opponent participant a display request requesting that the message be displayed; and a display request processor that, upon receiving from an opponent participant the display request, displays a message having contents represented by the message information stored in the opponent information storage unit, wherein the message information of the opponent participant is stored in said opponent information storage unit prior to said detector detecting the predetermined event.

15. A method of controlling a game system having a game server device and a plurality of game devices which, through communication with one another, enable players to play a game with multiple players as participants of the game for multiple players, the plurality of game devices being associated with one another, said method comprising:

storing, at said game server device, message information representing contents of a message sent by each of the players and identification information identifying each player in association with each other;

reading, at a game device among said plurality of game devices, the identification information from an information recording medium carried by the player and transmitting from the game device a message request containing the identification information and requesting that the message information corresponding to the identification information be transmitted as a response;

receiving at said game server device the message request and transmitting a message response containing the message information corresponding to the identification information contained in the message request, the message response being the response to the message request;

performing at said game device a process of receiving the message response and writing in a personal information storage unit the message information contained in the message response for storage and performing a process of transmitting the message information stored in the personal information storage unit to an opponent participant, while performing a process of receiving, from the opponent participant, message information of the opponent participant and writing the message information of the opponent participant in an opponent information storage unit for storage; and performing at said game device a process of detecting a predetermined event and displaying a message having contents represented by the message information stored in the personal information storage unit and performing a process of transmitting to an opponent participant a display request requesting that the message be displayed, while performing a process of, upon receiving from the opponent participant a display request of the opponent participant, displaying a message having contents represented by the message information of the opponent participant stored in the opponent information storage unit, wherein the message information of the opponent participant is stored in said opponent information storage unit of said game device prior to the detecting of the predetermined event.

16. A game server device for use in a game system having:

(1) a plurality of game devices, each of said plurality of game devices having: a personal information storage unit that stores information written for a player of the each game device among the plurality of game devices;

an opponent information storage unit that stores information that has been written with respect to an opponent participant;

a reader that reads identification information from an information recording medium in which the identification information is recorded;

a delivery requester that transmits, to the game server device, the message request containing the identification information read by said reader;

an opponent information writer that, upon receiving from the opponent participant, message information of the opponent participant, writes the message information of the opponent participant into said opponent information storage unit;

a detector that detects a predetermined event;

an event processor that, in a case in which the event is detected by said detector, performs a process of displaying a message having contents represented by the message information stored in said personal information storage unit and performs a process of transmitting to the opponent participant display request requesting that the message be displayed; and a display request processor that, upon receiving from the opponent participant a display request of the opponent participant, displays a message having contents represented by the message information of the opponent participant stored in said opponent information storage unit, and (2) a plurality of terminal devices, each of said terminal devices having:

an input device operated by each of the players who uses each of said terminal devices, a display device, and a processor for causing an edit screen for editing the message information transmitted by the second transmitter of the game server device, wherein the processor transmits the identification information unique to the one of the players to the game server device, receives the message information of the one of the players from the game server device, and displays the edit screen of the message information, thereby prompting the one of the players to edit the message information by operating the input device, and replies to the game server device with an edit result as update information, the game server device comprising:

(a) a storage unit that stores message information of a player and identification information unique to the player in association with each other;

(b) a first transmitter that transmits, upon receiving a message request from one of said plurality of game devices, message information to the one said plurality of game devices which, through communication with one another, enable players to play a game with multiple players as participants of the game with multiple players, game devices used by the players in playing the game among said plurality of game devices being associated with one another as the participants of the game and the message information representing contents of a message of each of the players;

(c) a second transmitter that, upon receiving identification information from one of said terminal devices, transmits message information to the one of said terminal devices after reading from the storage unit message information corresponding to identification information specified by the one of said terminal devices that is operated by one of the players, and (d) an updater that, upon receiving the update information transmitted from the one of said terminal devices, updates the message information stored in the storage unit with the update information.

* * * * *